(12) United States Patent
Kim

(10) Patent No.: US 12,050,795 B2
(45) Date of Patent: Jul. 30, 2024

(54) APPARATUS AND METHOD FOR MANAGING MAP DATA BETWEEN HOST AND MEMORY SYSTEM

(71) Applicant: SK hynix Inc., Gyeonggi-do (KR)

(72) Inventor: Jung Woo Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 16 days.

(21) Appl. No.: 18/104,295

(22) Filed: Feb. 1, 2023

(65) Prior Publication Data

US 2024/0126462 A1     Apr. 18, 2024

(30) Foreign Application Priority Data

Oct. 17, 2022   (KR) .................. 10-2022-0133233

(51) Int. Cl.
*G06F 3/06*     (2006.01)

(52) U.S. Cl.
CPC ............ *G06F 3/064* (2013.01); *G06F 3/0652* (2013.01); *G06F 3/0658* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2017/0123972 A1* | 5/2017 | Gopinath | .............. | G06F 3/0616 |
| 2020/0143871 A1* | 5/2020 | Kim | .................... | G11C 11/4093 |
| 2020/0272332 A1* | 8/2020 | Jhan | ...................... | G06F 3/0604 |
| 2020/0272561 A1* | 8/2020 | Chen | .................. | G06F 12/0246 |
| 2020/0272570 A1* | 8/2020 | Kao | .................... | G06F 12/0246 |
| 2020/0272574 A1* | 8/2020 | Shen | .................. | G06F 12/1009 |
| 2020/0363993 A1* | 11/2020 | Choi | .................... | G06F 3/0679 |
| 2022/0113877 A1 | 4/2022 | Kim et al. | | |

* cited by examiner

*Primary Examiner* — Kevin Verbrugge
(74) *Attorney, Agent, or Firm* — IP & T GROUP LLP

(57) ABSTRACT

Disclosed is a memory system including a memory device including a plurality of memory blocks; and a controller suitable for performing a garbage collection operation by: moving, when a first victim block related to map data stored in an external device is included in a plurality of victim blocks selected from the plurality of memory blocks, one or more pieces of valid data from the first victim block to a temporary block, which is a free block among the plurality of memory blocks, erasing the first victim block to set the first victim block as a first target block, and moving first valid data, which correspond to the map data stored in the external device among the valid data, from the temporary block to an original location within the first target block, wherein the first valid data is originally stored in the original location before the garbage collection operation.

21 Claims, 13 Drawing Sheets

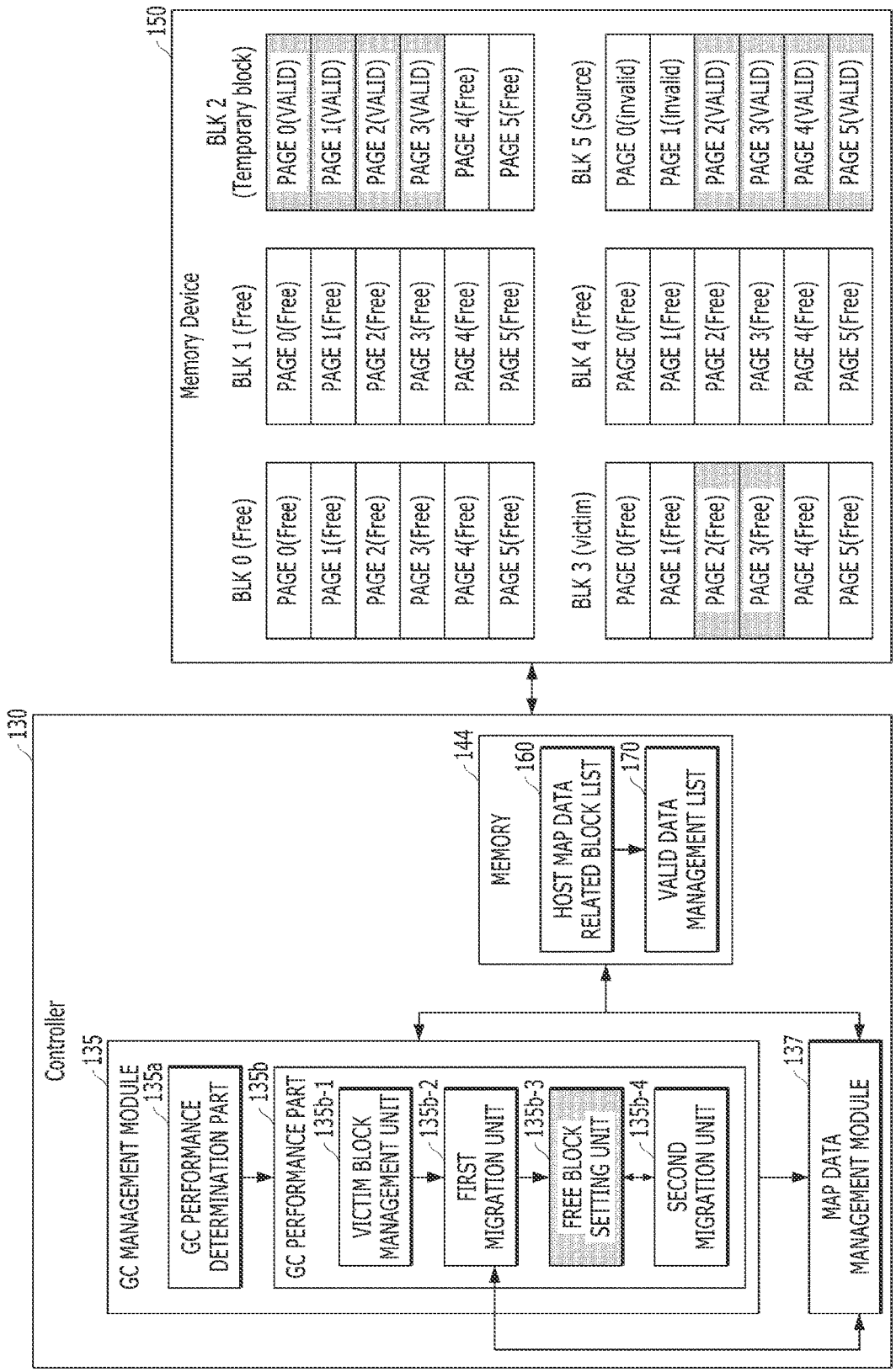

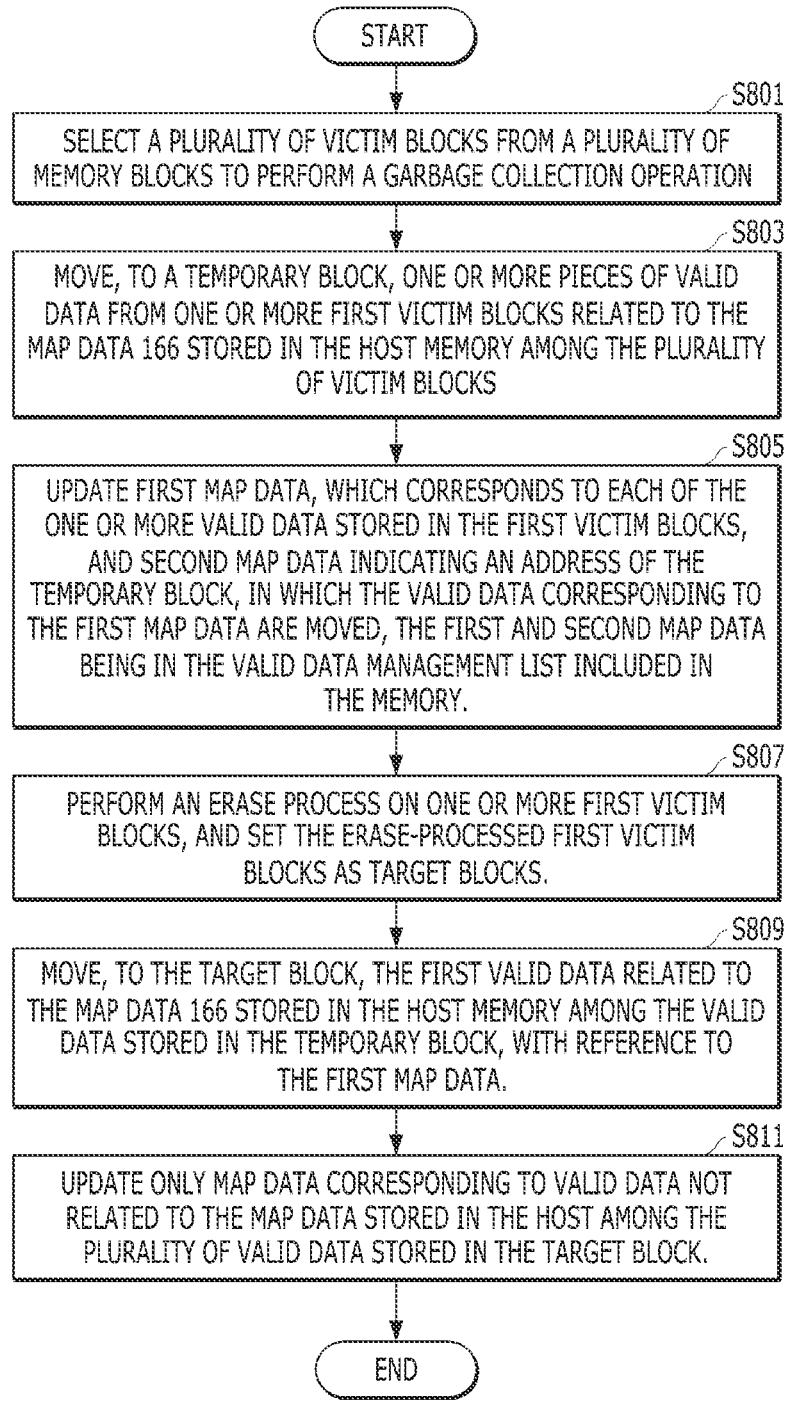

APPARATUS AND METHOD FOR MANAGING MAP DATA BETWEEN HOST AND MEMORY SYSTEM

CROSS-REFERENCE TO RELATED APPLICATION(S)

The present application claims priority under 35 U.S.C. § 119(a) to Korean Patent Application No. 10-2022-0133233, filed on Oct. 17, 2022, the disclosure of which is incorporated herein by reference in its entirety.

BACKGROUND

1. Field

Various embodiments of the present disclosure generally relate to a data processing system, and particularly, to an apparatus and a method for managing map data between a host and a memory system.

2. Description of the Related Art

A memory system is capable of storing data according to a request from a host such as a computer, a mobile terminal (e.g., a smart phone and a tablet), or various electronic devices. The memory system may include a controller for controlling a memory, for example, a volatile memory or a non-volatile memory. The controller may receive a command from the host, and execute or control operations for reading, writing or erasing data on a memory device included in the memory system. Meanwhile, host performance booster (HPB) technology in which the host provides the memory system with mapping information, i.e., map data, between a logical address and a physical address together with a read command is being used in order to reduce read latency of the memory system. The map data may be changed due to an internal operation, i.e., a background operation, of the memory system, and the changed map data may be transferred to and stored in the host.

SUMMARY

Various embodiments of the present disclosure are directed to an apparatus and a method for managing map data between a host and a memory system to minimize updating of map data stored in the host.

These technical objectives obtainable from the present disclosure are not limited to those described herein, and other technical objectives not described herein will be apparently understood by those skilled in the art, to which the present disclosure pertains, from the following description.

Various embodiments of the present disclosure are directed to a memory device, a memory system, a controller included in the memory system, or a data processing device including the memory system.

In accordance with an embodiment of the present disclosure, a memory system include: a memory device including a plurality of memory blocks; and a controller suitable for performing a garbage collection operation by: moving, when a first victim block related to map data stored in an external device is included in a plurality of victim blocks selected from the plurality of memory blocks, one or more pieces of valid data from the first victim block to a temporary block, which is a free block among the plurality of memory blocks, erasing the first victim block to set the first victim block as a first target block, and moving first valid data, which correspond to the map data stored in the external device among the valid data, from the temporary block to an original location within the first target block, wherein the first valid data is originally stored in the original location before the garbage collection operation.

Aspects of the present disclosure are only some of the embodiments of the present disclosure, and various embodiments in which technical features of the present disclosure are reflected can be derived and understood by those skilled in the art, to which the present disclosure pertains, on the basis of detailed descriptions of the present disclosure to be described below.

BRIEF DESCRIPTION OF THE DRAWINGS

FIGS. 7A to 7F are diagrams for describing a data processing operation of the memory system according to an embodiment of the present disclosure.

FIG. 8 is a diagram for describing an operating method of the memory system according to an embodiment of the present disclosure.

DETAILED DESCRIPTION

Hereinafter, various embodiments of the present disclosure will be described below in detail with reference to the accompanying drawings. In the following description, only parts necessary for understanding the operation according to the present disclosure will be described, and the description of the other parts will be omitted so as not to obscure the subject matter of the present disclosure.

Figure 1:
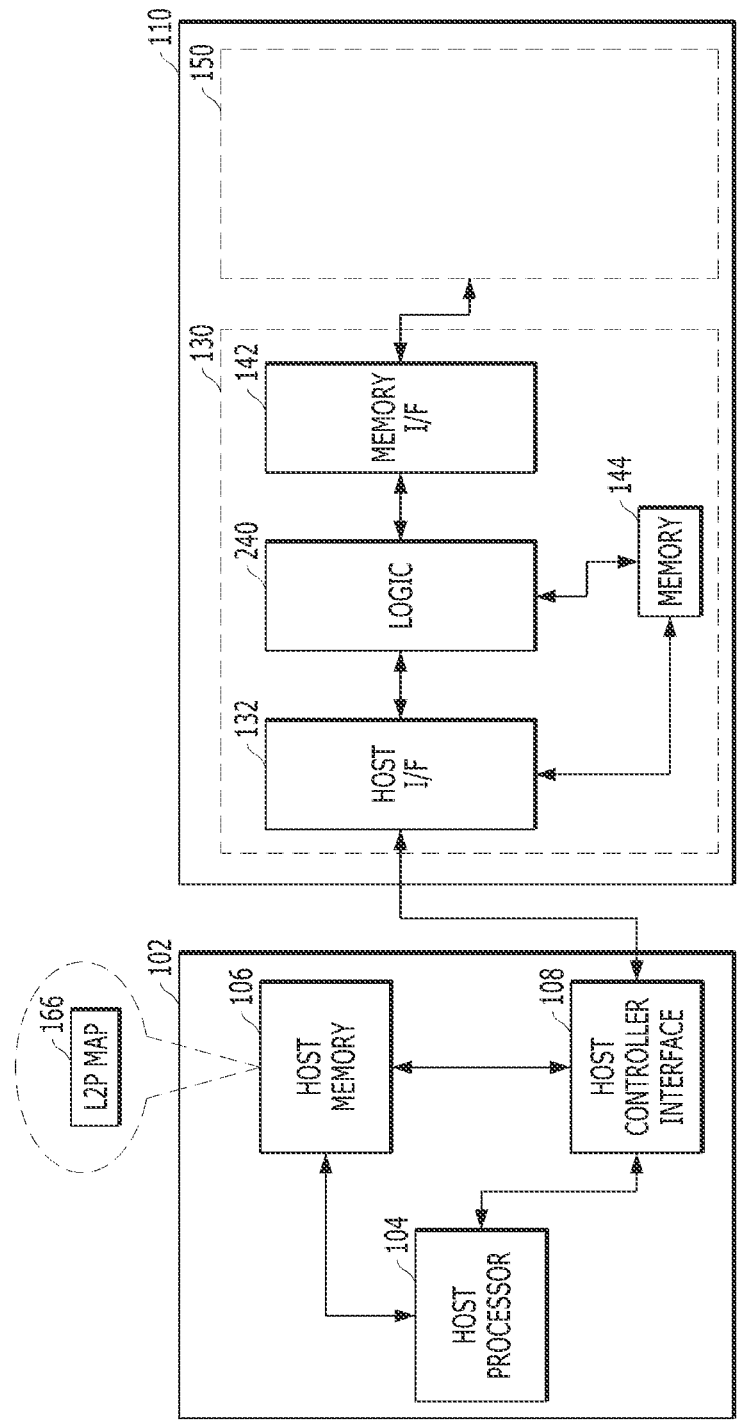
FIG. 1 illustrates a data processing system according to an embodiment of the present disclosure.

FIG. 1 illustrates a data processing system according to an embodiment of the present disclosure. Specifically, FIG. 1 illustrates an example of the data processing system in which a host memory 106 included in a host 102 is used as a device capable of temporarily storing map data used in a memory system 110.

Referring to FIG. 1, the host 102 may include a host processor 104, the host memory 106, and a host controller interface 108. The memory system 110 may include a controller 130 and a memory device 150. The controller 130 and the memory device 150 described with reference to FIG. 1 may be similar to a controller 130 and a memory device 150 described with reference to FIGS. 2 to 4. In addition, a logic block 160 included in the controller 130 described with reference to FIG. 1 may correspond to a flash translation layer (FTL) described with reference to FIG. 2. However, according to an embodiment, the logic block 160 in the controller 130 may further perform roles and functions not given in descriptions of the flash translation layer (FTL).

The host 102 may include the high-performance host processor 104 and the large-capacity host memory 106 compared to the memory system 110 interworking with the host 102. Unlike the memory system 110, the host processor 104 and the host memory 106 included in the host 102 have less space constraint, and hardware upgrades of the host processor 104 and the host memory 106 are made as necessary. Accordingly, resources of the host 102 may be utilized to raise operational efficiency of the memory system 110.

As the amount of data stored in the memory system 110 increases, the amount of map data corresponding to the data stored in the memory system 110 also increases. Since the space of the memory 144 into which the controller 130 included in the memory system 110 may load the map data is limited, an increase in the amount of map data places a burden on an operation of the controller 130. For example, due to the limitation of the space in the memory 144 allocated by the controller 130 for the map data, the controller 130 may load a part, not all, of the map data. In the case where a location that the host 102 intends to access is not included in the partially loaded map data, the controller 130 has to re-store the loaded map data in the memory device 150 when the partially loaded map data is updated, and read map data, which corresponds to the location that the host 102 intends to access, from the memory device 150, These operations may be necessarily performed for the controller 130 to perform a read or write operation requested by the host 102, and may degrade the operational performance of the memory system 110.

According to an embodiment, a storage space of the host memory 106 included in the host 102 may be tens to thousands of times larger than that of the memory 144 that the controller 130 can use. Accordingly, the memory system 110 may transfer map data L2P MAP 166 used by the controller 130 to the host memory 106 in the host 102, and allow the host memory 106 in the host 102 to be used as a cache memory for an address translation process performed by the memory system 110. In this case, the host 102 may not transfer a logical address together with a command to the memory system 110, but convert the logical address into a physical address on the basis of the map data 166 stored in the host memory 106, and then transfer the physical address together with the command to the memory system 110. The memory system 110 may omit a process of converting the logical address into the physical address, and access the memory device 150 on the basis of the transferred physical address. In this case, since the operation burden generated while the controller 130 uses the memory 144, which has been described above, can be eliminated, the operational efficiency of the memory system 110 may increase greatly. In this regard, the read operation between the host 102 and the memory system 110 will be described in detail with reference to FIG. 5.

Even though the memory system 110 transfers the map data 166 to the host 102, the memory system 110 may manage a source, which serves as a reference for the map data 166, that is, update, delete or generate the map data 166. The controller 130 in the memory system 110 may perform a background operation, such as a garbage collection operation and a wear leveling operation, depending on an operating state of the memory device 150, and determine a physical location, i.e., a physical address, at which data transferred from the host 102 is stored in the memory device 150. Therefore, the physical address of the data in the memory device 150 may be changed. Accordingly, the management of the information or the source serving as the reference for the map data 166 may be performed by the memory system 110. In addition, when the memory system 110 determines that the map data 166 stored in the host memory 106 in the host 102 also needs to be updated due to the change of the map data, the memory system 110 has to perform an additional operation for synchronization with the host 102, In this regard, an operation of updating the map data 166 when the memory system 110 determines that the map data 166 stored in the host memory 106 in the host 102 also needs to be updated will be described in detail with reference to FIG. 6.

As such, in order to minimize the synchronization process of the host 102 and the memory system 110, the map data 166 stored in the host memory 106 may not be changed, To this end, when the background operation, that is, the garbage collection operation, is performed, data corresponding to the map data 166 stored in the host memory 106 needs to be stored back at an address where the data has been stored before the garbage collection operation is performed.

Figure 2:
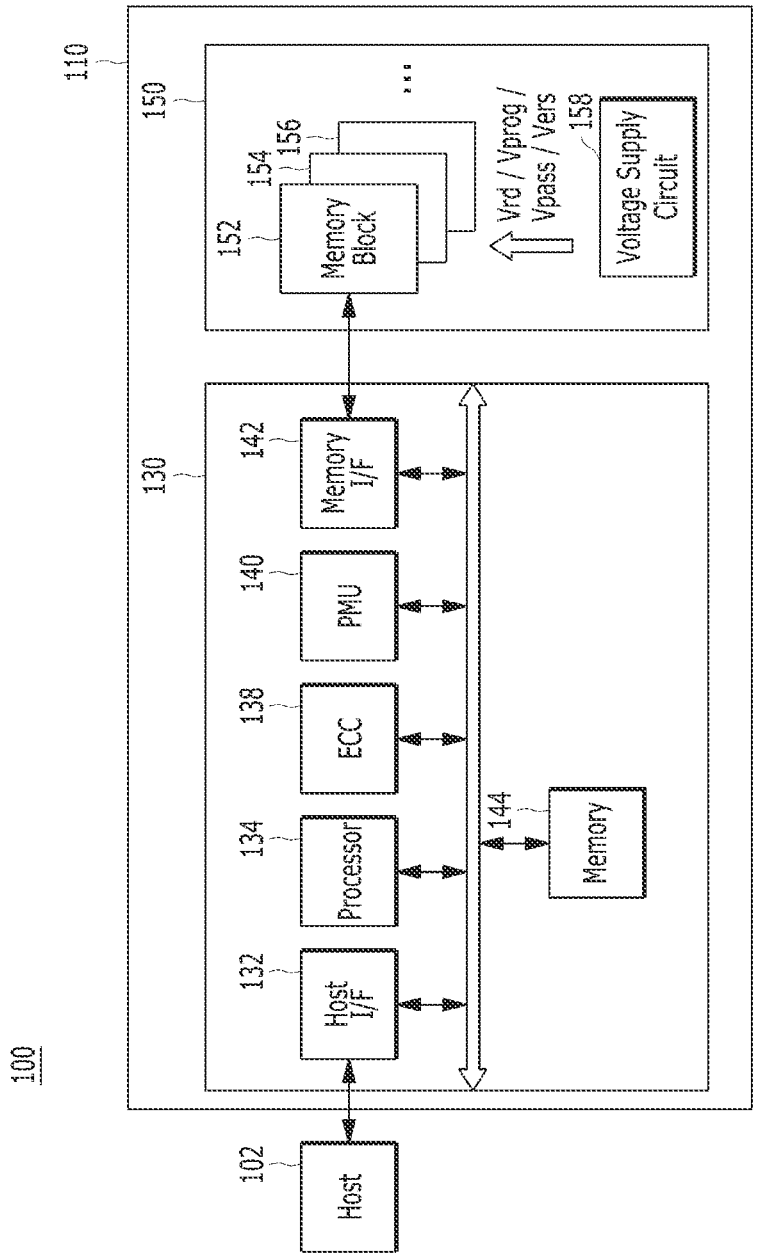
FIG. 2 illustrates a data processing system according to another embodiment of the present disclosure.

FIG. 2 illustrates a data processing system 100 according to another embodiment of the present disclosure.

Referring to FIG. 2, the data processing system 100 includes a host 102 and a memory system 110, For example, the host 102 and the memory system 110 may be connected to each other through a data transfer elements such as a data bus or a host cable, and transfer and receive data.

The memory system 110 may include a memory device 150 and a controller 130, The memory device 150 and the controller 130 in the memory system 110 may be physically separated components. The memory device 150 and the controller 130 may be connected to each other through at least one data path. For example, the data path may be configured as a channel and/or a way, According to an embodiment, the memory device 150 and the controller 130 may be functionally separated components. Also, according to an embodiment, the memory device 150 and the controller 130 may be implemented through one semiconductor device chip or a plurality of semiconductor device chips, According to an embodiment, in the case of the memory system 110 requiring a high degree of integration, the memory device 150 and the controller 130 may be configured as one semiconductor device chip.

The memory device 150 may include a plurality of memory blocks 152, 154, and 156. The memory blocks 152, 154, and 156 may each be a group of non-volatile memory cells from which data is removed together through an erase operation. Although not illustrated, the memory blocks 152, 154, and 156 may each include a page, which is a group of non-volatile memory cells that store data together during a program operation or output data together during a read operation. For example, a plurality of pages may be included in each of the memory blocks 152, 154, and 156.

Although not illustrated, the memory device 150 may include a plurality of memory planes or a plurality of memory dies. According to an embodiment, each of the memory planes may include at least one memory block 152, 154 or 156, and be a logical or physical partition including a driving circuit capable of controlling an array composed of a plurality of non-volatile memory cells and a buffer capable of temporarily storing data inputted to or outputted from the plurality of non-volatile memory cells.

In addition, according to an embodiment, each of memory dies may include at least one memory plane, and be a set of components implemented on a physically separable substrate. Each of the memory dies may be connected to the controller 130 through the data path, and include an interface for exchanging data and signals with the controller 130.

According to an embodiment, the memory device 150 may include at least one memory block 152, 154 or 156, at least one memory plane, or at least one memory die. Internal configurations of the memory device 150 described with reference to FIG. 2 may vary in response to the operational performance of the memory system 110. An embodiment of the present disclosure may not be limited to the internal configurations described with reference to FIG. 2.

Referring to FIG. 2, a voltage supply circuit 170 may supply a read voltage Vrd, a program voltage Vprog, a pass voltage Vpass, or an erase voltage Vers into a non-volatile memory cell included in a memory block. For example, during a read operation for reading data stored in the non-volatile memory cell in the memory block(s) 152, 154, 156, the voltage supply circuit 170 may supply the read voltage Vrd to a selected non-volatile memory cell, During the program operation for storing data in the non-volatile memory cell in the memory block(s) 152, 154, 156, the voltage supply circuit 170 may supply the program voltage Vprog into a selected non-volatile memory cell. During a read operation or a program operation performed on the selected non-volatile memory cell, the voltage supply circuit 170 may supply a pass voltage Vpass to a non-selected non-volatile memory cell. During the erasing operation for erasing data stored in the non-volatile memory cell in the memory block(s) 152, 154, 156, the voltage supply circuit 170 may supply the erase voltage Vers to the memory block.

The memory device 150 may store information regarding various voltages which are supplied to the memory block(s) 152, 154, 156 based on which operation is performed. For example, when a non-volatile memory cell in the memory block(s) 152, 154, 156 may store multi-bit data, plural levels of the read voltage Vrd may be used for recognizing or reading the multi-bit data item. The memory device 150 may include a table with information indicating plural levels of the read voltage Vrd corresponding to the multi-bit data item. For example, the table may include bias values stored in a register, with each bias value corresponding to a specific level of the read voltage Vrd. The number of bias values for the read voltage Vrd used for a read operation may be limited to a preset range. Also, in an embodiment, the bias values can be quantized.

The host 102 may include a portable electronic device (e.g., a mobile phone, an MP3 player, a laptop computer, etc.) or a non-portable electronic device e.g., a desktop computer, a game player, a television, a projector, etc. According to an embodiment, the host 102 may include a central processing unit (CPU) included in the portable electronic device and the non-portable electronic device.

The host 102 may include at least one operating system (OS), which can control functions and operations performed in the host 102. The OS may provide interoperability between the host 102 engaged operatively with the memory system 110 and a user who intends to store data in the memory system 110. The OS may support functions and operations corresponding to user requests, By way of example but not limitation, the OS may be classified into a general operating system and a mobile operating system according to mobility of the host 102. The general operating system may be split into a personal operating system and an enterprise operating system according to system requirements or a user environment. As compared with the personal operating system, the enterprise operating systems can be specialized for securing and supporting high performance computing.

The mobile operating system may be subject to support services or functions for mobility e.g., a power saving function. The host 102 may include a plurality of operating systems and may execute multiple operating systems interlocked with the memory system 110, corresponding to a user request. The host 102 may transmit a plurality of commands corresponding to user requests to the memory system 110, thereby performing operations corresponding to the plurality of commands within the memory system 110.

The controller 130 may control the memory device 150 in response to a request or a command from the host 102, For example, the controller 130 may perform a read operation to provide data read from the memory device 150 to the host 102 and may perform a write operation (for example, a program operation) to store data input from the host 102 in the memory device 150. In order to perform data input/output (I/O) operations, the controller 130 may control and manage internal operations of reading data, programming data, erasing data, or the like.

According to an embodiment, the controller 130 may include a host interface (I/F) 132, a processor 134, error correction circuitry (ECC) 138, a power management unit (PMU) 140, a memory interface (I/F) 142, and a memory 144, Components in the controller 130 as illustrated in FIG. 2 may vary according to structures, functions, operation performance, or the like, regarding the memory system 110.

For example, the memory system 110 may be implemented with any of various types of storage devices electrically coupled with the host 102 according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like. Components may be added to or omitted from the controller 130 according to implementation of the memory system 110.

Each of the host 102 and the memory system 110 may include a controller or an interface for transmitting and receiving signals, data, and the like, in accordance with one or more predetermined protocols. For example, the host interface 132 in the memory system 110 may include an apparatus capable of transmitting signals, data, and the like to the host 102 or receiving signals, data, and the like from the host 102.

The host interface 132 may receive signals, commands (or requests), and/or data input from the host 102, For example, the host 102 and the memory system 110 may use a predetermined protocol to transmit and receive data therebetween. Examples of communication standards or interfaces supported by the host 102 and the memory system 110 for sending and receiving data include Universal Serial Bus (USB), Mufti-Media Card (MMC), Parallel Advanced Technology Attachment (DATA), Small Computer System Interface (SCSI), Enhanced Small Disk Interface (ESDI), Integrated Drive Electronics (IDE), Peripheral Component Interconnect Express (PCIe or PCI-e), Serial-attached SCSI (SAS), Serial Advanced Technology Attachment (SATA), Mobile Industry Processor Interface (MIPI), and the like. According to an embodiment, the host interface 132 is a type of layer for exchanging data with the host 102 and is implemented with, or driven by, firmware called a host interface layer (HIL).

The Integrated Drive Electronics (IDE) or Advanced Technology Attachment (ATA) may be used as one of the interfaces for transmitting and receiving data and, for example, may use a cable including a predetermined number of (e.g., 40) wires connected in parallel to support data transmission and data reception between the host 102 and the memory system 110. When a plurality of memory systems 110 are connected to a single host 102, the plurality of memory systems 110 may be divided into a master and a slave using a position or a dip switch to which the plurality of memory systems 110 are connected. The memory system 110 set as the master may be used as a main memory device. The IDE (ATA) may include, for example, Fast-ATA, ATAPI, or Enhanced IDE (EIDE).

A Serial Advanced Technology Attachment (SATA) interface is a type of serial data communication interface that is compatible with various ATA standards of parallel data communication interfaces used by Integrated Drive Electronics (IDE) devices. The 40 wires in the IDE interface can be reduced to six wires in the SATA interface. For example, 40 parallel signals for the IDE may be converted into 6 serial signals for the SATA interface. The SATA interface has been widely used because of its faster data transmission and reception rate and its less resource consumption in the host 102 used for the data transmission and reception. The SATA interface may connect up to 30 external devices to a single transceiver included in the host 102. In addition, the SATA interface can support hot plugging that allows an external device to be attached to or detached from the host 102, even while data communication between the host 102 and another device is being executed. Thus, the memory system 110 may be connected or disconnected as an additional device, like a device supported by a universal serial bus (USB), even when the host 102 is powered on. For example, in the host 102 having an eSATA port, the memory system 110 may be freely attached to or detached from the host 102 like an external hard disk.

Small Computer System Interface (SCSI) is a type of serial data communication interface used for connecting a computer or a server with other peripheral devices. The SCSI can provide high transmission speed compared with other interfaces such as IDE and SATA. In the SCSI, the host 102 and at least one peripheral device (e.g., memory system 110) are connected in series, but data transmission and reception between the host 102 and each peripheral device may be performed through a parallel data communication. In the SCSI, it is easy to connect or disconnect a device such as the memory system 110 to or from the host 102. The SCSI may support connections of 15 other devices to a single transceiver included in host 102.

Serial Attached SCSI (SAS) may be a serial data communication version of the SCSI. In SAS, the host 102 and a plurality of peripheral devices are connected in series, and data transmission and reception between the host 102 and each peripheral device may be performed in a serial data communication scheme. Also, SAS can support connection between the host 102 and the peripheral device through a serial cable instead of a parallel cable, to easily manage equipment using the SAS and enhance or improve operational reliability and communication performance. Also, SAS may support connections of eight external devices to a single transceiver included in the host 102.

The Non-volatile memory express (NVMe) is a type of interface based at least on a Peripheral Component Interconnect Express (PCIe) designed to increase performance and design flexibility of the host 102, servers, computing devices, and the like equipped with the non-volatile memory system 110. PCIe can use a slot or a specific cable for connecting a computing device (e.g., host 102) and a peripheral device e.g., memory system 110. For example, PCIe can use a plurality of pins (e.g., 18 pins, 32 pins, 49 pins, or 82 pins) and at least one wire (e.g., xi, x4, x8, or x16) to achieve high speed data communication over several hundred MB per second e.g., 250 MB/s, 500 MB/s, 984.6250 MB/s, or 1969 MB/s. According to an embodiment, a PCIe scheme may achieve bandwidths of tens to hundreds of Giga bits per second. NVMe can support an operation speed of the non-volatile memory system 110, such as an SSD, that is faster than a hard disk.

According to an embodiment, the host 102 and the memory system 110 may be connected through a universal serial bus (USB), The Universal Serial Bus (USB) is a type of scalable, hot-pluggable plug-and-play serial interface that can provide cost-effective standard connectivity between the host 102 and peripheral devices, e.g., a keyboard, a mouse, a joystick, a printer, a scanner, a storage device, a modem, a video camera, and the like. A plurality of peripheral devices such as the memory system 110 may be coupled to a single transceiver included in the host 102.

The error correction circuitry 138 may correct error bits of data read from the memory device 150, and may include an error correction code (ECC) encoder and an ECC decoder. The ECC encoder may perform error correction encoding of data to be programmed in the memory device 150 in order to generate encoded data into which a parity bit is added. The encoded data may be stored in memory device 150. The ECC decoder may detect and correct error bits contained in the data read from the memory device 150 when the controller 130 reads the data stored in the memory device 150. For example, after performing error correction decoding on the data read from the memory device 150, the error correction circuitry 138 determines whether the error correction decoding has succeeded or not and outputs an instruction signal (e.g., a correction success signal or a correction fail signal) based on a result of the error correction decoding. The error correction circuitry 138 may use a parity bit generated during the ECC encoding process for the data stored in the memory device 150, in order to correct the error bits of the read data. When the number of the error bits is greater than or equal to the number of correctable error bits, the error correction circuitry 138 may not correct the error bits and instead may output the correction fail signal indicating failure in correcting the error bits.

According to an embodiment, the error correction circuitry 138 may perform an error correction operation based on coded modulation, Examples include a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), or the like. The error correction circuitry 138 may include all circuits, modules, systems, and/or devices for performing the error correction operation based on at least one of the above described codes. In an embodiment, the error correction circuitry 138 may include at least some of the components in the controller 130 shown in FIG. 1.

The ECC decoder may perform hard decision decoding or soft decision decoding on data transmitted from the memory device 150. Hard decision decoding may be one of two methods broadly classified for error correction. Hard decision decoding may include, for example, an operation of correcting an error hit by reading digital data of '0' or '1' from a non-volatile memory cell in the memory device 150. Because the hard decision decoding handles a binary logic signal, the circuit/algorithm design or configuration may be simpler and processing speed may be faster than the soft decision decoding.

Soft decision decoding may quantize a threshold voltage of a non-volatile memory cell in the memory device 150 by two or more quantized values (e.g., multiple bit data, approximate values, an analog value, and the like) in order to correct an error bit based on the two or more quantized values. The controller 130 may receive two or more alphabets or quantized values from a plurality of non-volatile memory cells in the memory device 150, and then perform decoding based on information generated by characterizing the quantized values as a combination of information such as conditional probability or likelihood.

According to an embodiment, the ECC decoder may use low-density parity-check and generator matrix (LDPC-GM) code among methods designed for the soft decision decoding. A low-density parity-check (LDPC) code uses an algorithm that may read values of data from the memory device 150 in several bits according to reliability, not simply data of 1 or 0 like the hard decision decoding, and iteratively repeats it through a message exchange in order to improve reliability of the values. Then, the values are finally determined as data of 1 or 0. For example, a decoding algorithm using LDPC codes may be probabilistic decoding, Hard decision decoding in which a value output from a non-volatile memory cell is coded as 0 or 1.

Compared to hard decision decoding, soft decision decoding may determine the value stored in the non-volatile memory cell based on the stochastic information. Regarding bit-flipping which may be considered an error that may occur in the memory device 150, soft decision decoding may provide improved probability of correcting the error and recovering data, as well as providing reliability and stability of corrected data. The LDPC-GM code may have a scheme in which internal low-density generator matrix (LDGM) codes can be concatenated in series with high-speed LDPC codes.

According to an embodiment, the ECC decoder may use, for example, low-density parity-check convolutional codes (LDPC-CCs) for the soft decision decoding. The LDPC-CCs may correspond to a scheme using linear time encoding and pipeline decoding based on a variable block length and a shift register.

According to an embodiment, the ECC decoder may use, for example, a Log Likelihood Ratio Turbo Code (LLR-TC) for soft decision decoding. A Log Likelihood Ratio (LLR) may be calculated as a non-linear function for a distance between a sampled value and an ideal value. In addition, a Turbo Code (TC) may include a simple code (for example, a hamming code) in two or three dimensions and repeat decoding in a row direction and a column direction to improve reliability of values.

The power management unit (PMU) 140 may control electrical power provided to the controller 130. The PMU 140 may monitor the electrical power supplied to the memory system 110 (e.g., a voltage supplied to the controller 130) and provide the electrical power to components included in the controller 130, The PMU 140 may not only detect power-on or power-off, but may also generate a trigger signal to enable the memory system 110 to urgently back up a current state when the electrical power supplied to the memory system 110 is unstable. According to an embodiment, the PMU 140 may include a device or a component capable of accumulating electrical power that may be used in an emergency.

The memory interface 142 may serve as an interface for handling commands and data transferred between the controller 130 and the memory device 150, in order to allow the controller 130 to control the memory device 150 in response to a command or a request input from the host 102, When the memory device 150 is a flash memory, the memory interface 142 may generate a control signal for the memory device 150 and may process data input to, or output from, the memory device 150 under the control of the processor 134.

For example, when the memory device 150 includes a NAND flash memory, the memory interface 142 includes a NAND flash controller (NFC). The memory interface 142 may provide an interface for handling commands and data between the controller 130 and the memory device 150. In accordance with an embodiment, the memory interface 142 may be implemented through, or driven by, firmware called a Flash Interface Layer (FIL) for exchanging data with the memory device 150.

According to an embodiment, the memory interface 142 may support an open NAND flash interface (ONFi), a toggle mode, or the like, for data input/output with the memory device 150, For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 may be achieved through at least one interface regarding an asynchronous single data rate (SDR), a synchronous double data rate (DDR), a toggle double data rate (DDR), or the like.

The memory 144 may be used as a working memory of the memory system 110 or the controller 130, while temporarily storing transactional data of operations performed in the memory system 110 and the controller 130. For example, the memory 144 may temporarily store read data output from the memory device 150 in response to a read request from the host 102 before the read data is output to the host 102.

In addition, the controller 130 may temporarily store write data input from the host 102 in the memory 144 before programming the write data in the memory device 150, When the controller 130 controls operations such as a data read operation, a data write or program operation, a data erase operation, etc., of the memory device 150, data transmitted between the controller 130 and the memory device 150 of the memory system 110 may be temporarily stored in the memory 144.

In addition to the read data or write data, the memory 144 may store information (e.g., map data, read requests, program requests, etc.) used for inputting or outputting data between the host 102 and the memory device 150. According to an embodiment, the memory 144 may include one or more of a command queue, a program memory, a data memory, a write buffer/cache, a read buffer/cache, a data buffer/cache, a map buffer/cache, and so on. The controller 130 may allocate some storage space in the memory 144 for a component which is established to carry out a data input/output operation. For example, the write buffer established in the memory 144 may be used to temporarily store target data subject to a program operation.

In an embodiment, the memory 144 may be implemented with a volatile memory. For example, the memory 144 may be implemented with a static random access memory (SRAM), a dynamic random access memory (DRAM), or both. Although FIG. 2 illustrates that the memory 144 disposed within the controller 130, embodiments are not limited thereto. The memory 144 may be located within or external to the controller 130. For instance, the memory 144 may be embodied by an external volatile memory having a memory interface for transferring data and/or signals between the memory 144 and the controller 130.

The processor 134 may control overall operations of the memory system 110. For example, the processor 134 may control a program operation or a read operation of the memory device 150 in response to a write request or a read request entered from the host 102. According to an embodiment, the processor 134 may execute firmware to control the program operation or the read operation in the memory system 110. The firmware may be, for example, a flash translation layer (FTL). According to an embodiment, the processor 134 may be implemented with a microprocessor, a central processing unit (CPU), or another processing device.

According to an embodiment, the memory system 110 may be implemented with at least one multi-core processor. The multi-core processor is a type of circuit or chip in which two or more cores, which are considered distinct processing regions, are integrated. For example, when a plurality of cores in the mufti-core processor drive or execute a plurality of flash translation layers (FTLs) independently, data input/output speed or performance of the memory system 110 may be improved. According to an embodiment, the data input/output (I/O) operations in the memory system 110 may be independently performed through different cores in the multi-core processor.

The processor 134 in the controller 130 may perform an operation corresponding to a request or a command input from the host 102. Further, the memory system 110 may perform an operation independent from a command or a request input from the host 102. In one case, an operation performed by the controller 130 in response to the request or the command input from the host 102 may be considered a foreground operation, while an operation performed by the controller 130 independently from the request or the command input from the host 102 may be considered a background operation. The controller 130 may perform foreground or background operations for reading, writing, or erasing data in the memory device 150, In addition, a parameter set operation corresponding to a set parameter command or a set feature command as a set command transmitted from the host 102 may be considered a foreground operation. Examples of background operations that may be performed by controller 130 without a command transmitted from the host 102 include garbage collection (GC), wear leveling (WL), bad block management for identifying and processing bad blocks, or the like.

According to an embodiment, substantially similar operations may be performed as both the foreground operation and the background operation. For example, when the memory system 110 performs garbage collection in response to a request or a command input from the host 102 (e.g., manual GC), the garbage collection may be considered a foreground operation. When the memory system 110 performs garbage collection independently of the host 102 (e.g., auto GC), the garbage collection may be considered a background operation.

When the memory device 150 includes a plurality of dies or a plurality of chips, each including a plurality of non-volatile memory cells, the controller 130 may perform parallel processing regarding plural requests or commands input from the host 102 in order to improve performance of the memory system 110, For example, the transmitted requests or commands may be divided into plural groups including at least some of a plurality of planes, a plurality of dies, or a plurality of chips included in the memory device 150. The plural groups of requests or commands are processed individually or in parallel in each plane, each die or each chip.

The memory interface 142 in the controller 130 may be connected to the plurality of dies or chips in the memory device 150 through at least one channel and at least one way. When the controller 130 distributes and stores data in the plurality of dies through each channel or each way in response to requests or commands associated with a plurality of pages including non-volatile memory cells, a plurality of operations corresponding to the requests or the commands may be performed simultaneously or in parallel in the plurality of dies or planes, Such a processing method or scheme may be considered as an interleaving method. Because a data input/output speed of the memory system 110 increases by operating with the interleaving method, data I/O performance of the memory system 110 can be improved.

By way of example but not limitation, the controller 130 may recognize statuses of a plurality of channels or ways associated with the plurality of dies included in the memory device 150. The controller 130 may determine the status of each channel or each way as one of a busy status, a ready status, an active status, an idle status, a normal status, or an abnormal status. The determination of which channel or way an instruction and/or data is delivered through by the controller 130 may be associated with a physical block address. The controller 130 may refer to descriptors delivered from the memory device 150. The descriptors may include a block or page of parameters describing something about the memory device 150, The descriptors may have a predetermined format or structure. For instance, the descriptors may include device descriptors, configuration descriptors, unit descriptors, and the like. The controller 130 may refer to, or use, the descriptors to determine which channel(s) or way(s) is used to exchange an instruction or data.

As described above, the memory device 150 in the memory system 110 may include one or more memory blocks 152, 154, 156. Each of the memory blocks 152, 154, 156 includes a plurality of non-volatile memory cells. According to an embodiment, the memory blocks 152, 154, 156 may be a group of non-volatile memory cells erased together. The memory blocks 152, 154, 156 may include a plurality of pages, which is a group of non-volatile memory cells read or programmed together.

In an embodiment, each of the memory blocks 152, 154, 156 may have a three-dimensional stack structure for high integration. Further, the memory device 150 may include a plurality of dies, each die including a plurality of planes, each plane including the memory blocks 152, 154, 156. A configuration of the memory device 150 may be changed depending on performance of the memory system 110.

The memory device 150 includes memory blocks 152, 154, and 156 which may be any of single-level cell (SLC) memory blocks, mufti-level cell (MLC) memory blocks, or the like, based on the number of bits that may be stored in one memory cell. An SLC memory block includes a plurality of pages implemented by memory cells each capable of storing one bit of data. An SLC memory block may have higher data I/O operation performance and higher durability than the MLC memory block. An MLC memory block includes a plurality of pages implemented by memory cells each capable of storing multi-bit data, e.g., two or more bits of data. The MLC memory block may have larger storage capacity for the same space compared to the SLC memory block. The MLC memory block can be highly integrated in view of storage capacity.

In an embodiment, the memory device 150 may be implemented with MLC memory blocks such as a double level cell (DLC) memory block, a triple-level cell (TLC)

memory block, a quadruple-level cell (QLC) memory block, or a combination thereof, A DLC memory block may include a plurality of pages implemented by memory cells, with each memory cell capable of storing 2-bit data. A TLC memory block may include a plurality of pages implemented by memory cells, with each memory cell capable of storing 3-bit data. A QLC memory block may include a plurality of pages implemented by memory cells, with each memory cell capable of storing 4-bit data. In another embodiment, the memory device 150 may be implemented with a block including a plurality of pages implemented by memory cells, with each memory cell capable of storing five or more bits of data.

According to an embodiment, the controller 130 may use an MLC memory block included in the memory device 150 as an SLC memory block that stores one-bit data in one memory cell. A data input/output speed of the multi-level cell (MLC) memory block may be slower than that of the SLC memory block. For example, when the MLC memory block is used as the SLC memory block, the margin for a read or program operation can be reduced. For example, the controller 130 may perform a data input/output operation with a higher speed when the MLC memory block is used as the SLC memory block. Thus, the controller 130 may use the MLC memory block as an SLC buffer to temporarily store data because the buffer may use a high data input/output speed for improving performance of the memory system 110.

According to an embodiment, the controller 130 may program data in an MLC a plurality of times without performing an erase operation on a specific MLC memory block included in the memory device 150. In general, non-volatile memory cells do not support data overwrite. However, the controller 130 may program 1-bit data in the MLC a plurality of times using a feature in which the MLC is capable of storing mufti-bit data. For an MLC overwrite operation, the controller 130 may store the number of program times as separate operation information when 1-bit data is programmed in an MLC. According to an embodiment, an operation for uniformly levelling threshold voltages of the MLCs may be carried out before another 1-bit data is programmed in the same MLCs, each having stored another-bit data.

In an embodiment, the memory device 150 is embodied as a non-volatile memory such as a flash memory, for example, as a NAND flash memory, a NOR flash memory, or the like. In another embodiment, the memory device 150 may be implemented by at least one of a phase change random access memory (PCRAM), a ferroelectrics random access memory (FRAM), a spin transfer torque random access memory (STT-RAM), a spin transfer torque magnetic random access memory (STT-MRAM), or the like.

Figure 3:
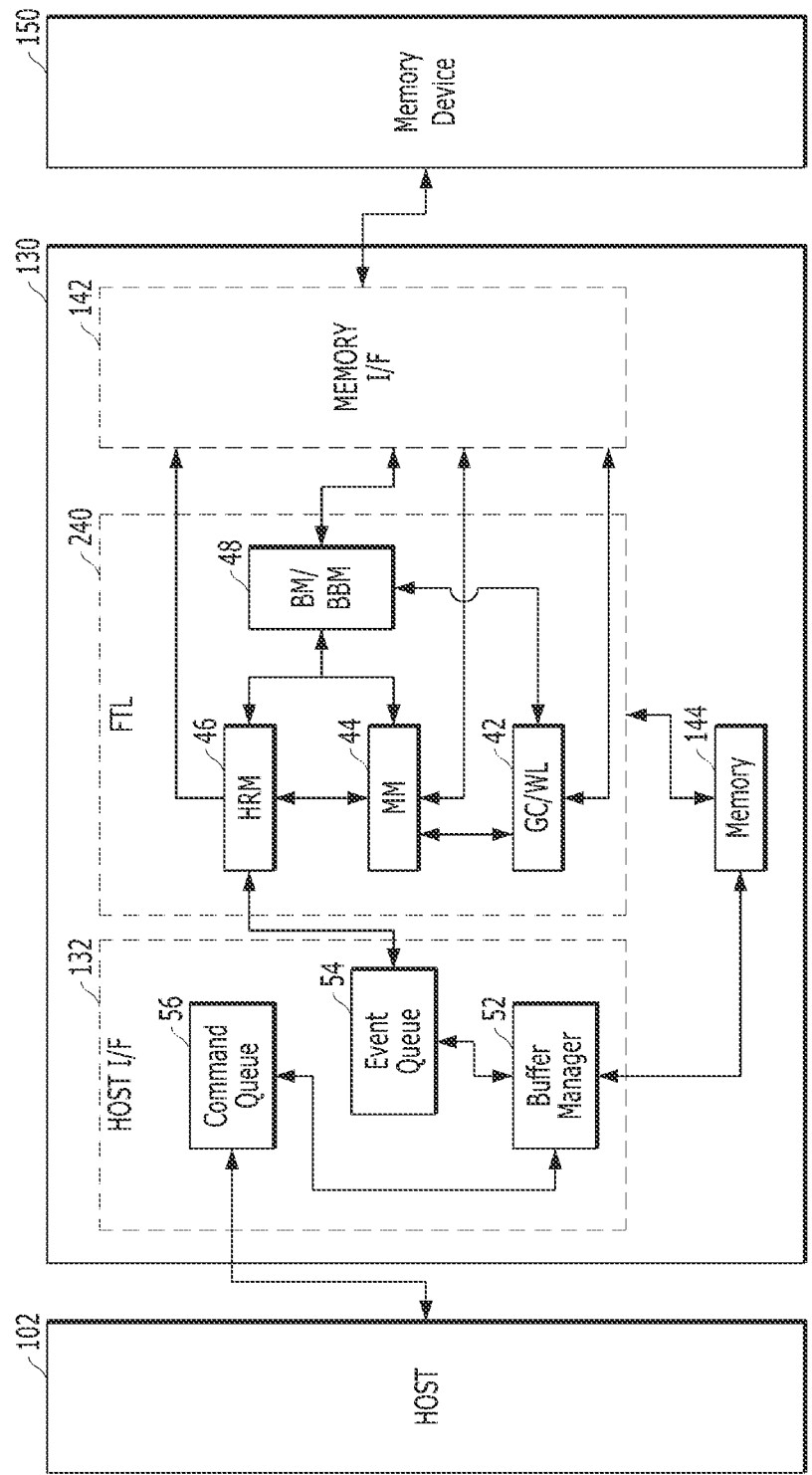
FIG. 3 illustrates a memory system according to still another embodiment of the present disclosure.

Referring to FIG. 3, the controller 130 in a memory system operates along with the host 102 and the memory device 150. As illustrated, the controller 130 includes the host interface 132, a flash translation layer (FTL) 240, the memory interface 142, and the memory 144 previously identified with reference to FIG. 2.

According to an embodiment, the error correction circuitry 138 illustrated in FIG. 2 may be included in the flash translation layer (FTL) 240. In another embodiment, the error correction circuitry 138 may be implemented as a separate module, a circuit, firmware, or the like, which is included in or associated with the controller 130.

The host interface 132 may handle commands, data, and the like transmitted from the host 102. By way of example but not limitation, the host interface 132 may include a command queue 56, a buffer manager 52, and an event queue 54, The command queue 56 may sequentially store the commands, the data, and the like received from the host 102, and output them to the buffer manager 52, for example, in an order in which they are stored in the command queue 56. The buffer manager 52 may classify, manage, or adjust the commands, the data, and the like received from the command queue 56. The event queue 54 may sequentially transmit events for processing the commands, the data, and the like received from the buffer manager 52.

A plurality of commands or data of the same characteristic may be transmitted from the host 102, or a plurality of commands and data of different characteristics may be transmitted to the memory system 110 after being mixed or jumbled by the host 102. For example, a plurality of commands for reading data, i.e., read commands, may be delivered, or a command for reading data, i.e., a read command, and a command for programming/writing data, i.e., a write command, may be alternately transmitted to the memory system 110. The host interface 132 may sequentially store commands, data, and the like, which are transmitted from the host 102, in the command queue 56. Thereafter, the host interface 132 may estimate or predict what type of internal operations the controller 130 will perform according to the characteristics of the commands, the data, and the like, which have been transmitted from the host 102. The host interface 132 may determine a processing order and a priority of commands, data and the like based on their characteristics.

According to the characteristics of the commands, the data, and the like transmitted from the host 102, the buffer manager 52 in the host interface 132 is configured to determine whether the buffer manager 52 should store the commands, the data, and the like in the memory 144, or whether the buffer manager 52 should deliver the commands, the data, and the like to the flash translation layer (FTL) 240. The event queue 54 receives events, transmitted from the buffer manager 52, which are to be internally executed and processed by the memory system 110 or the controller 130 in response to the commands, the data, and the like, and delivers the events to the flash translation layer (FTL) 240 in the order of the events input to the event queue 54.

In accordance with an embodiment, the flash translation layer (FTL) 240 illustrated in FIG. 3 may implement a multi-thread scheme to perform data input/output (I/O) operations. A multi-thread FTL may be implemented through a multi-core processor using a multi-thread scheme included in the controller 130.

In accordance with an embodiment, the flash translation layer (FTL) 240 may include a host request manager (HRM) 46, a map manager (MM) 44, a state manager 42, and a block manager 48. The host request manager (HRM) 46 may manage the events transmitted from the event queue 54. The map manager (MM) 44 may handle or control map data. The state manager 42 may perform garbage collection (GC) or wear leveling (WL). The block manager 48 may execute commands or instructions onto a block in the memory device 150.

By way of example but not limitation, the host request manager (HRM) 46 may use the map manager (MM) 44 and the block manager 48 to handle or process requests according to read and program commands and events which are delivered from the host interface 132. The host request manager (HRM) 46 may send an inquiry request to the map manager (MM) 44 to determine a physical address corresponding to a logical address which is entered with the events. The host request manager (HRM) 46 may send a read request with the physical address to the memory interface 142 to process the read request, i.e., handle the events. In one embodiment, the host request manager (HRM) 46 may send a program request (or a write request) to the block manager 48 to program data to a specific empty page storing no data in the memory device 150, and then may transmit a map update request corresponding to the program request to the map manager (MM) 44 in order to update an item relevant to the programmed data in information of mapping the logical and physical addresses to each other.

The block manager 48 may convert a program request delivered from the host request manager (HRM) 46, the map manager (MM) 44, and/or the state manager 42 into a flash program request used for the memory device 150, in order to manage flash blocks in the memory device 150. In order to maximize or enhance program or write performance of the memory system 110, the block manager 48 may collect program requests and send flash program requests for multiple-plane and one-shot program operations to the memory interface 142. In an embodiment, the block manager 48 sends several flash program requests to the memory interface 142 to enhance or maximize parallel processing of a multi-channel and multi-directional flash controller.

In an embodiment, the block manager 48 may manage blocks in the memory device 150 according to the number of valid pages, select and erase blocks having no valid pages when a free block is needed, and select a block including the least number of valid pages when it is determined that garbage collection is to be performed. The state manager 42 may perform garbage collection to move valid data from the selected block to an empty block and erase data stored in the selected block so that the memory device 150 may have enough free blocks (i.e., empty blocks with no data). When the block manager 48 provides information regarding a block to be erased to the state manager 42, the state manager 42 may check all flash pages of the block to be erased to determine whether each page of the block is valid.

For example, to determine validity of each page, the state manager 42 may identify a logical address recorded in an out-of-band (00B) area of each page. To determine whether each page is valid, the state manager 42 may compare a physical address of the page with a physical address mapped to a logical address obtained from an inquiry request. The state manager 42 sends a program request to the block manager 48 for each valid page. A map table may be updated by the map manager 44 when a program operation is complete.

The map manager 44 may manage map data, e.g., a logical-physical map table. The map manager 44 may process various requests, for example, queries, updates, and the like, which are generated by the host request manager (FIRM) 46 or the state manager 42. The map manager 44 may store the entire map table in the memory device 150, e.g., a flash/non-volatile memory, and cache mapping entries according to the storage capacity of the memory 144. When a map cache miss occurs while processing inquiry or update requests, the map manager 44 may send a read request to the memory interface 142 to load a relevant map table stored in the memory device 150, When the number of dirty cache blocks in the map manager 44 exceeds a certain threshold value, a program request may be sent to the block manager 48, so that a clean cache block is made and a dirty map table may be stored in the memory device 150.

When garbage collection is performed, the state manager 42 copies valid page(s) into a free block, and the host request manager (FIRM) 46 may program the latest version of the data for the same logical address of the page and concurrently issue an update request. When the state manager 42 requests the map update in a state in which the copying data stored in the valid page(s) is not completed normally, the map manager 44 may not perform the map table update. The map manager 44 may perform a map update operation to ensure accuracy when, or only if, the latest map table still points to the old physical address, FIG. 4 illustrates internal configuration of the controller shown in FIGS. 1 to 3 according to an embodiment of the present disclosure.

Figure 4:
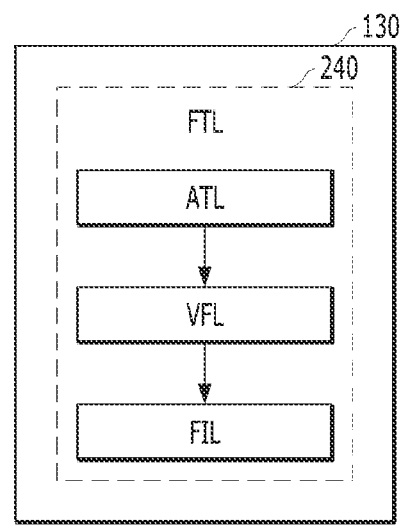
FIG. 4 illustrates an internal hierarchy of a controller illustrated in FIGS. 1 to 3 according to embodiments of the present disclosure.

Referring to FIG. 4, the flash translation layer (FTL) 240 in the controller 130 may be divided into three layers: an address translation layer ATL; a virtual flash layer VFL; and a flash Interface Layer FIL.

For example, the address translation layer ATL may convert a logical address LA transmitted from a file system into a logical page address. The address translation layer ATL may perform an address translation process regarding a logical address space, That is, the address translation layer ATL may perform an address translation process based on mapping information in which the logical page address LPA of the flash memory 140 is mapped to the logical address LA transmitted from the host. Such logical-to-logical address mapping information (hereinafter referred to as L2L mapping) may be stored in an area in which metadata is stored in the memory device 150.

The virtual flash layer VFL may convert the logical page address LPA, which is mapped by the address translation layer ATL, into a virtual page address VPA. Here, the virtual page address VPA may correspond to a physical address of a virtual memory device, That is, the virtual page address VPA may correspond to the memory block 60 in the memory device 150. If there is a bad block among the memory blocks 60 in the memory device 150, the bad block may be excluded by the virtual flash layer VFL. In addition, the virtual flash layer VFL may include a recovery algorithm for scanning a scan area to restore the logical-to-virtual address mapping information (L2V mapping) stored in the memory device 150 and mapping information in the data region for storing user data. The recovery algorithm is capable of recovering the logical-to-virtual address mapping information (L2V mapping). The virtual flash layer VFL may perform an address conversion process regarding the virtual address space, based on the logical-to-virtual address mapping information (L2V mapping) restored through the recovery algorithm.

The flash interface layer FIL may convert a virtual page address of the virtual flash layer VFL into a physical page address of the memory device 150. The flash interface layer FIL performs a low-level operation for interfacing with the memory device 150. For example, the flash interface layer FIL may include a low-level driver for controlling hardware of the memory device 150, an error correction code (ECC) for checking and correcting an error in data transmitted from the memory device 150, and a module for performing operations such as Bad Block Management (BBM).

Figure 5:
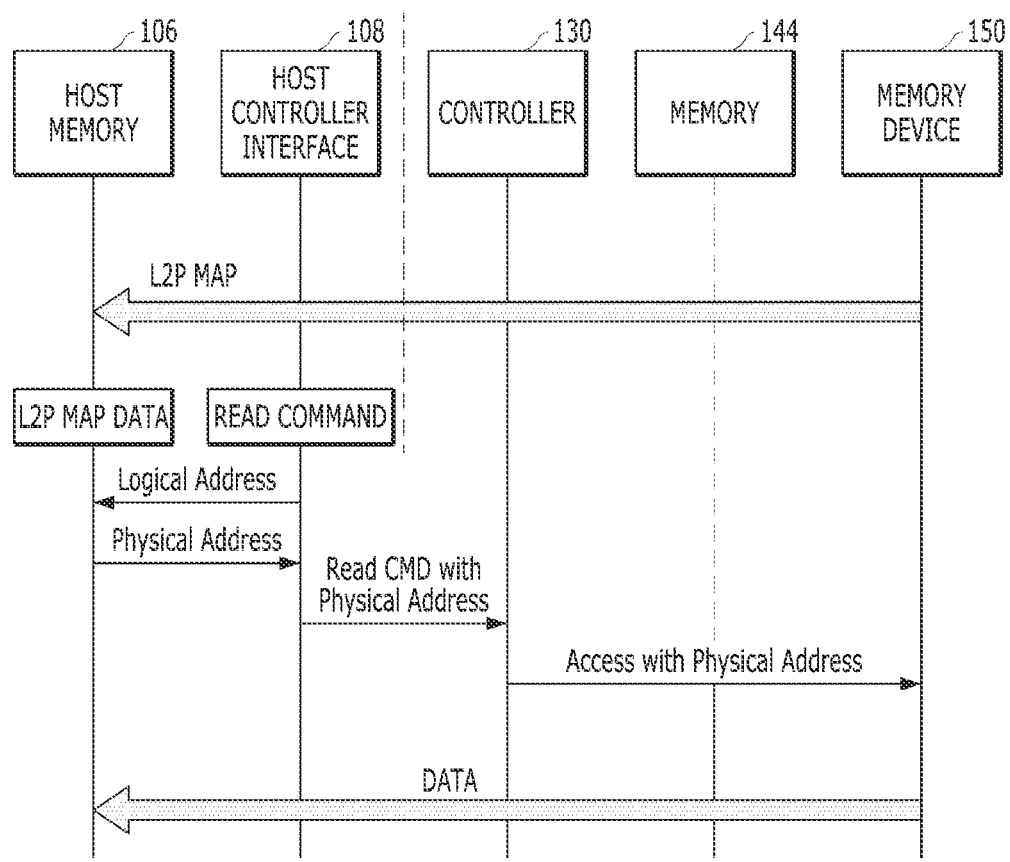
FIG. 5 illustrates a read operation of a host and a memory system in the data processing system according to an embodiment of the present disclosure.

FIG. 5 illustrates a read operation of the host 102 and the memory system 110 in the data processing system according to an embodiment of the present disclosure. Referring to FIGS. 1 to 5, when the map data 166 is stored in the host memory 106 in the host 102, an operation of the host 102 reading data in the memory system 110 is described.

Power may be supplied to the host 102 and the memory system 110, and the host 102 and the memory system 110 may interwork with each other. When the host 102 and the memory system 110 interwork with each other, map data L2P MAP stored in the memory device 150 may be transferred to the host memory 106.

When a read command CMD is generated by the host processor 104 in the host 102, the read command CMD is transferred to the host controller interface 108. After receiving the read command CMD, the host controller interface 108 transfers a logical address corresponding to the read command CMD to the host memory 106. The host controller interface 108 may recognize a physical address corresponding to the logical address, on the basis of the map data L2P MAP stored in the host memory 106.

The host controller interface 108 transfers the read command CMD together with the physical address to the controller 130 in the memory system 110. The controller 130 may access the memory device 150 on the basis of the received read command CMD and the physical address. Data stored in a location corresponding to the physical address in the memory device 150 may be transferred to the host memory 106.

The process of reading data from the memory device 150 including a non-volatile memory device may take more time than the process of reading data from the host memory 106, which is another non-volatile memory. In the above-described read process, a process in which the controller 130 receives a logical address from the host 102 and searches for a physical address corresponding to the logical address may be omitted. In particular, an operation of reading map data by accessing the memory device 150 in the process in which the controller 130 searches for the physical address may disappear. Accordingly, the process of the host 102 reading data stored in the memory system 110 may be further accelerated. Such an operation may be referred to as a host performance booster (HPB) operation.

Figure 6:
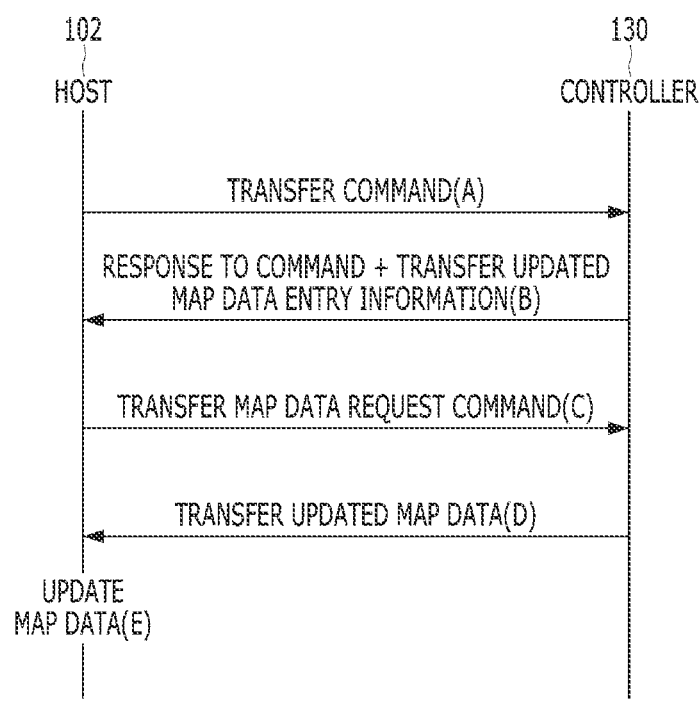
FIG. 6 is a diagram for describing a method of synchronizing map data between the host and the memory system according to an embodiment of the present disclosure.

FIG. 6 is a diagram for describing a method of synchronizing map data between the host 102 and the memory system 110 according to an embodiment of the present disclosure.

Before FIG. 6 is described, the controller 130 may perform a background operation. The background operation may include a garbage collection operation, a read reclaim operation and a wear leveling operation. In an embodiment of the present disclosure, the garbage collection operation is described as an example. Whenever performing the garbage collection operation, the controller 130 may update map data corresponding to valid data stored in one or more blocks on which the garbage collection operation is performed. That is, as physical addresses corresponding to one or more logical addresses are changed through the garbage collection operation, the controller 130 may update the map data with the latest physical addresses. In addition, when the controller 130 determines that it is necessary to modify and update the map data 166 transferred to the host 102 in the process of managing the map data, the memory system 110 may request the host 102 to update the map data.

Referring to FIG. 6, the controller 130 receives a command for performing a write operation, a read operation, or an erase operation from the host 102 (A). The controller 130 transfers a response message to the command, which includes entry information of updated map data, to the host 102 (B). That is, the controller 130 may allow the entry information to be included in the response message to the command in order to inform the host 102 of map data to be updated, and transfer the response message including the entry information to the host 102, After confirming the response message received from the controller 130, the host 102 transfers a map data request command for requesting the corresponding map data to be updated to the controller 130 (C). The controller 130 transfers the updated map data to the host 102 in response to the map data request command received from the host 102 (D). The host 102 may update the map data stored in the host memory 106 to the latest version on the basis of the updated map data received from the controller 130 (E).

Whenever the map data is changed due to the background operation of the controller 130, the host 102 needs to receive the changed map data from the controller 130, and to perform an additional operation of updating the map data stored in the host memory 106 in the same manner as described above when the changed map data is also stored in the host memory 106. In the present disclosure, in order to minimize the operation of updating the map data 166 stored in the host memory 106 according to the change of the map data through the garbage collection operation of the controller 130, when a victim block related to the map data of the host memory 106 is selected while the controller 130 performs the garbage collection operation, the controller 130 moves, to a free block, valid data from a plurality of valid pages within the victim block, After setting the victim block as a free block through the erase operation, the controller 130 moves valid data related to the map data 166 stored in the host memory 106 again into an original location where the data has been stored before the garbage collection operation is performed. When this operation is performed, the controller 130 transfers the map data changed according to the change of the map data through the garbage collection operation to the host 102, and the host 102 does not need to perform an additional operation of updating the map data in the host memory 106 to the latest map data received from the controller 130. That is, the map data 166 stored in the host memory 106 may be maintained without being changed to the map data changed through the garbage collection operation of the controller 130, and a synchronization operation between the host 102 and the memory system 110 may be minimized. Such an operation will be described in detail with reference to FIGS. 7A to 7F.

FIGS. 7A to 7F are diagrams for describing a data processing operation of the memory system 110 according to an embodiment of the present disclosure.

Referring to FIGS. 7A to 7F, the memory device 150 may include a plurality of dies (not illustrated). Each of the dies may include a plurality of memory blocks. For example, the plurality of memory blocks may include a zeroth memory block BLK0, a first memory block BLEU, a second memory block BLK2, a third memory block BLK3, a fourth memory block BLK4, and a fifth memory lock BLK5. For convenience in description in an embodiment of the present disclosure, just a plurality of blocks included in one of the plurality of dies are illustrated and described, and the scope of the present disclosure is not limited thereto. The plurality of memory blocks BLK0 to BLK5 may be divided into free blocks, open or active blocks, and source blocks. The free blocks represent blocks in which data are not stored, the open blocks, which are blocks in which data are stored, represent blocks in which pages to write data remain, and the source blocks, which are blocks in which data are stored, represent blocks in which pages to write data do not remain. That is, the source blocks represent that there are no blank pages to write data. Based on such a configuration, processes of a garbage collection management module 135 and a map data management module 137 are described.

Referring to FIGS. 7A to 7F, the garbage collection management module 135 may include a garbage collection performance determination part 135a and a garbage collection performance part 135b. The garbage collection performance part 135b may include a victim block management unit 135b-1, a first migration unit 135b-2, a free block setting unit 135b-3, and a second migration unit 135b-4.

Figure 7A:
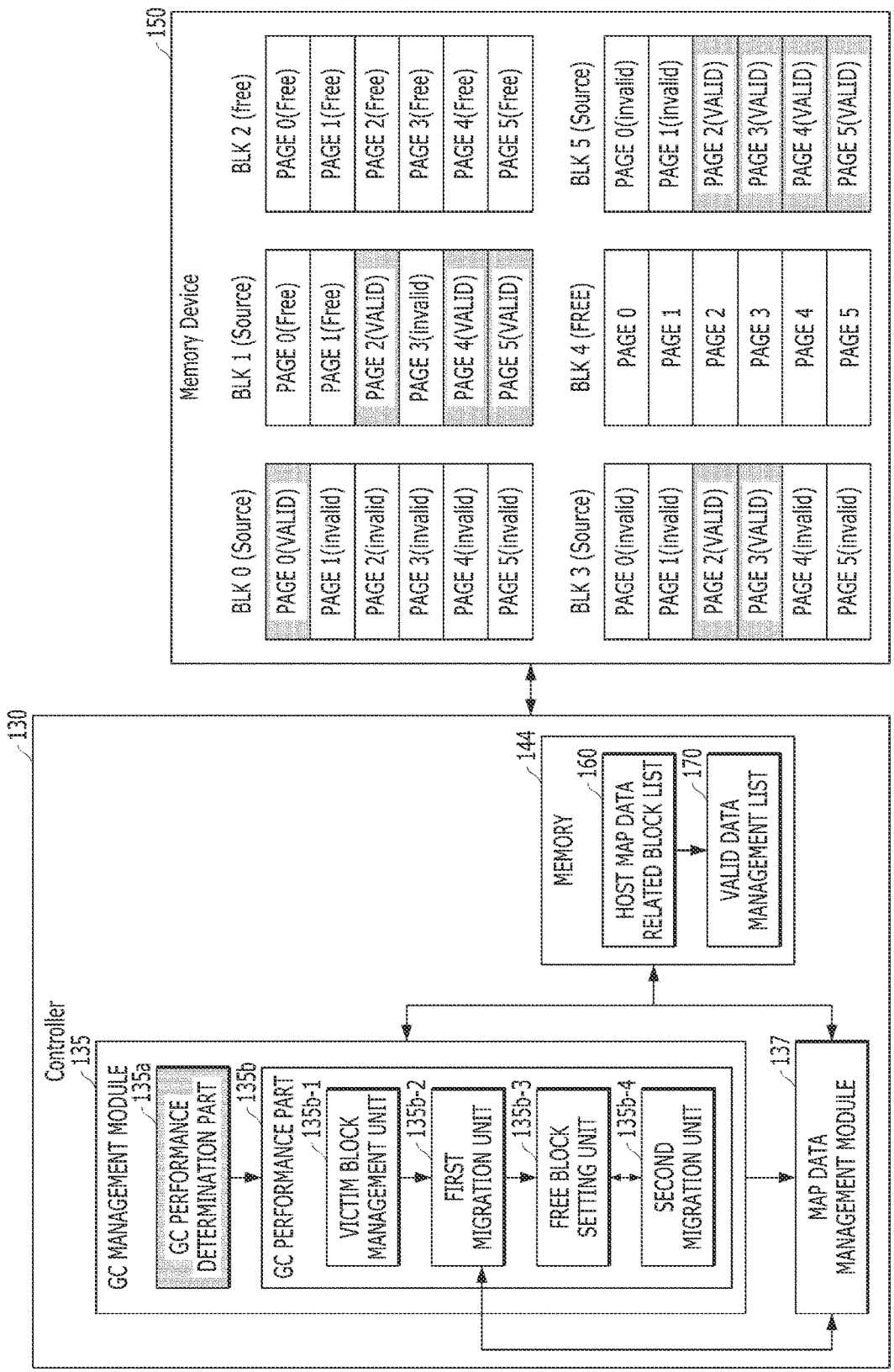
Figure 7B:
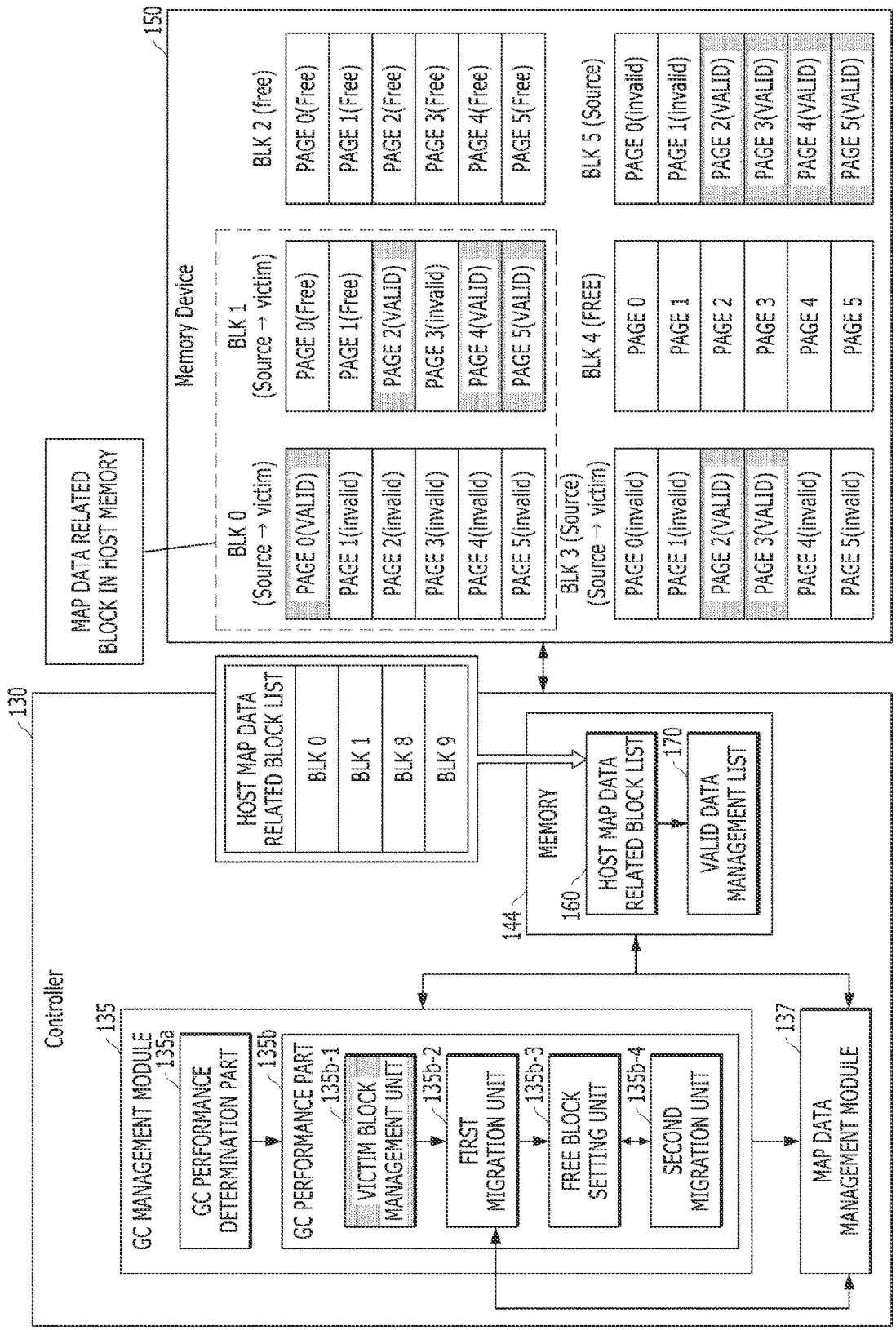

Referring to FIG. 7A, the garbage collection performance determination part 135a determines whether to perform the garbage collection operation, on the basis of a free block count FBC at regular intervals. That is, the garbage collection performance determination part 135a may determine whether to perform the garbage collection operation, by checking whether the free block count FBC is less than a predetermined first threshold value TH1. The predetermined first threshold value TH1 is a minimum free block count necessary for the controller 130 to determine a time point to secure one or more free blocks. The predetermined first threshold value TH1 may be a predetermined value, and the minimum free block count may vary according to an operating condition of the memory system 110. When it is determined that the free block count FBC is equal to or greater than the first threshold value TH1 (FBC>=TH1), the garbage collection performance determination part 135a determines not to perform the garbage collection operation, and determines whether to perform the garbage collection operation, on the basis of the free block count FBC at regular intervals. On the other hand, when it is determined that the free block count FBC is less than the first threshold value TH1, the garbage collection performance determination part 135a transmits a message to the garbage collection performance part 135b to enter a garbage collection performance mode because an event for performing the garbage collection operation (hereinafter referred to as a "garbage collection event") has occurred. As such, when the garbage collection event occurs, the garbage collection operation may be performed by the garbage collection performance part 135b, For example, when the minimum free block count is set to "3", the garbage collection performance part 135b may enter the garbage collection performance mode and perform the garbage collection operation because the free block count of the plurality of memory blocks BLK0 to BLK5 included in the memory device 150 is 2.

Referring to FIGS. 76, the victim block management unit 135b-1 may select victim blocks from a plurality of source blocks to perform the garbage collection operation. Specifically, the victim block management unit 135b-1 may select, as the victim blocks, source blocks each having a valid page count equal to or less than a predetermined second threshold value TH2 from the plurality of source blocks included in the plurality of memory blocks. That is, the victim block management unit 135b-1 may select, as the victim blocks for garbage collection processing, source blocks each having an invalid page count greater than the second threshold value TH2 from the plurality of source blocks. For example, when the second threshold value TH2 is "3", the victim block management unit 135b-1 may select, as the victim blocks, source blocks each having the valid page count equal to or less than 3. As a check result, the source blocks each having the valid page count equal to or less than 3 may include the zeroth memory block BLK0, the first memory block BLK1 and the third memory block BLK3. Accordingly, the zeroth memory block BLK0, the first memory block BLK1 and the third memory block BLK3 may be selected as the victim blocks, Hereinafter, for convenience in description, the zeroth memory block BLK0, the first memory block BLK1 and the third memory block BLK3 are referred to as a zeroth victim block, a first victim block and a third victim block, respectively.

In addition, the victim block management unit 135b-1 may check whether victim blocks related to the map data 166 in the host memory 106 exist among the selected victim blocks. Specifically, the victim block management unit 135b-1 may check whether the victim blocks related to the map data 166 in the host memory 106 exist, by checking whether the selected victim blocks are included in a host map data related block list 160. The host map data related block list 160 may include memory block information of one or more memory blocks related to the map data 166 in the host memory 106. For example, the host map data related block list 160 may include information on the zeroth memory block BLK0, the first memory block BLK1, an eighth memory block BLK8 and a ninth memory block BLK9. The reason why it is checked whether the victim blocks related to the map data 166 in the host memory 106 exist is to move, to a temporary block, valid data related to the map data 166 in the host memory 106 among the valid data stored in the victim blocks related to the map data 166 in the host memory 106, and then move the valid data related to the map data 166 back to an original location in which the valid data is stored before performing the garbage collection operation. For example, the victim block management unit 135b-1 checks whether information on the zeroth victim block, the first victim block and the third victim block are included in the host map data related block list 160. As a check result, it may be seen that the information on the zeroth victim block and the first victim block are included in the host map data related block list 160. Accordingly, it may be seen that the zeroth victim block and the first victim block are memory blocks related to the map data 166 in the host memory 106.

When the plurality of victim blocks are not related to the map data 166 in the host memory 106, the victim block management unit 135b-1 copies valid data stored in the victim blocks onto the free blocks through the first migration unit 135b-2.

Figure 7C:
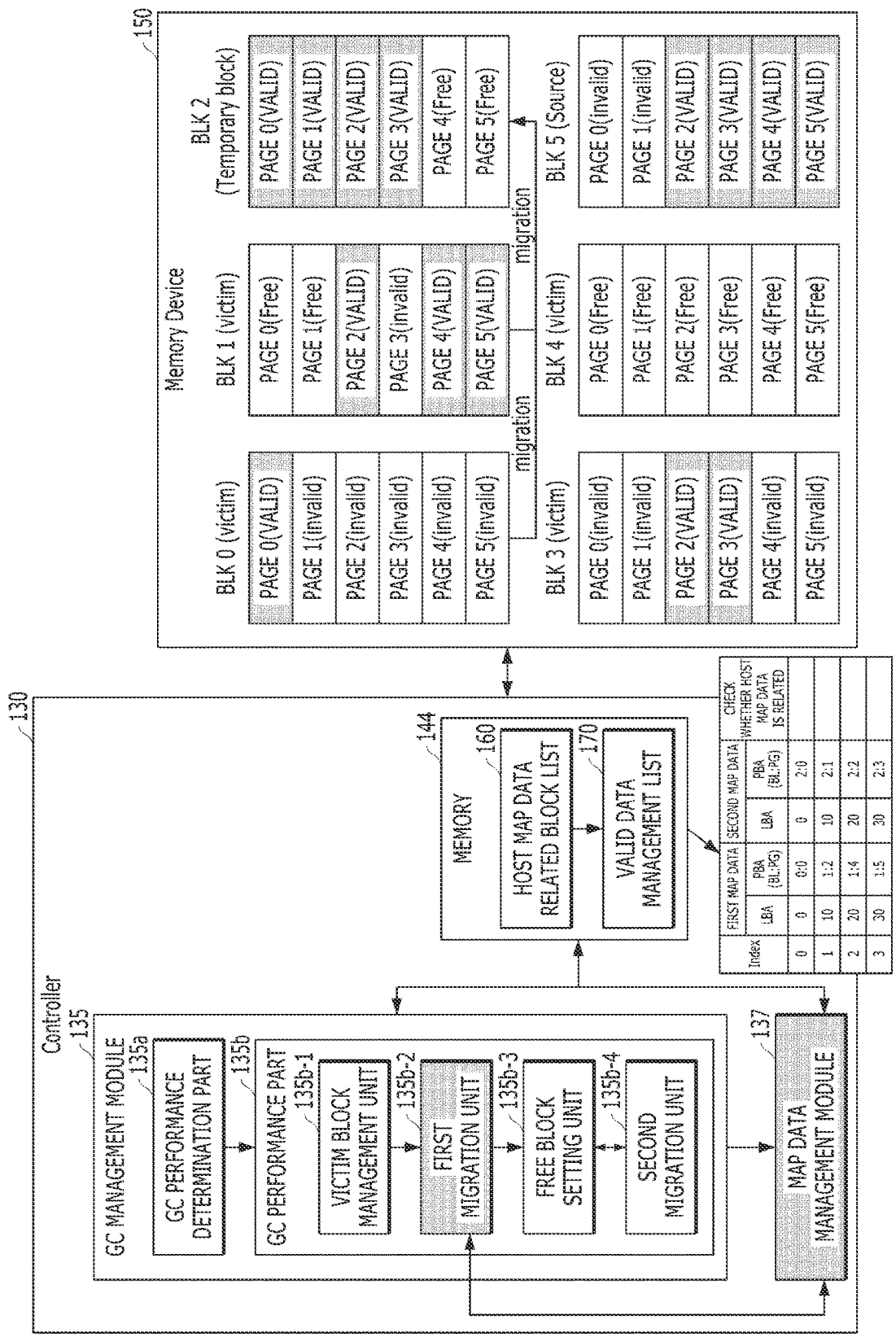

Referring to FIG. 7C, the first migration unit 135b-2 may temporarily move one or more pieces of valid data from the victim blocks related to the map data 166 in the host memory 106 to free pages of the temporary block. Any of the plurality of free blocks may be selected and set as the temporary block. For example, the first migration unit 135b-2 may select, as the temporary block, the second memory block BLK2 from the second memory block BLK2 and the fourth memory block BLK4, which are the free blocks and then temporarily move a plurality of valid data from the zeroth and first victim blocks to the temporary block and store the moved valid data in the temporary target block. That is, the first migration unit 135b-2 may temporarily move the valid data from a zeroth page of the zeroth victim block and the valid data from second, fourth and fifth pages of the first victim block to the second memory block BLK2 set as the temporary block, and store the moved valid data in the second memory block BLK2.

In addition, the first migration unit 135b-2 may request the map data management module 137 to update first map data, which correspond to each of the plurality of valid data stored in the victim blocks related to the map data 166 in the host memory 106 and second map data, which correspond to the first map data, of the valid data migrating to the temporary block into a valid data management list 170 in the memory 144.

When the map data management module 137 receives the request for updating the valid data management list 170 from the first migration unit 135b-2, the map data management module 137 stores map data of the valid data stored in the victim blocks related to the map data 166 in the host memory 106 in the first map data of the valid data management list 170, and stores, in the second map data of the valid data management list 170, map data of the valid data stored in the temporary block in correspondence with the first map data, that is, map data indicating an address of the temporary block in which the valid data corresponding to the first map data are moved.

As such, the reason why the first map data and the second map data are stored in the valid data management list 170 is to move the valid data related to the map data 166 in the host memory 106 again to an original location where the data has been stored before the garbage collection operation is performed and not to update the map data 166 in the host memory 106. For example, the map data management module 137 may store logical and physical addresses (block:pages, omitted below), which are the map data related to the valid data of the victim blocks, and logical and physical addresses, which are the map data related to the valid data of the temporary block indicating the changed addresses of valid data, in the valid data management list 170 in the memory 144. The reason why the logical addresses are stored together with the physical addresses is to check whether the map data corresponding to the valid data is stored in the map data in the host memory. For example, it may be seen from the valid data management list 170 that a logical address LBA 0 and a physical address PBA 0:0 (Block:Page) are stored in first map data of a zeroth index, and a logical address 0 and a physical address 2:0 are stored in second map data of the zeroth index correspondingly. A logical address LBA 1 and a physical address PBA 1:2 (Block:Page) may be stored in first map data of a first index, and a logical address 1 and a physical address 2:1 may be stored in second map data of the first index correspondingly. A logical address LBA 2 and a physical address PBA 1:4 (Block:Page) may be stored in first map data of a second index, and a logical address 2 and a physical address 2:2 may be stored in second map data of the second index correspondingly. A logical address LBA 10 and a physical address PBA 1:5 (Block:Page) may be stored in first map data of a third index, and a logical address and a physical address 2:3 may be stored in second map data of the third index correspondingly.

Referring to FIG. 7D, the free block setting unit 135b-3 may perform a first erase process on the victim blocks, from which valid data moved to the temporary block, and then set the victim blocks as free blocks. For example, the free block setting unit 135b-3 may erase all pages included in the zeroth and first victim blocks, and then set the zeroth and first victim blocks as the zeroth and first free blocks.

Figure 7E:
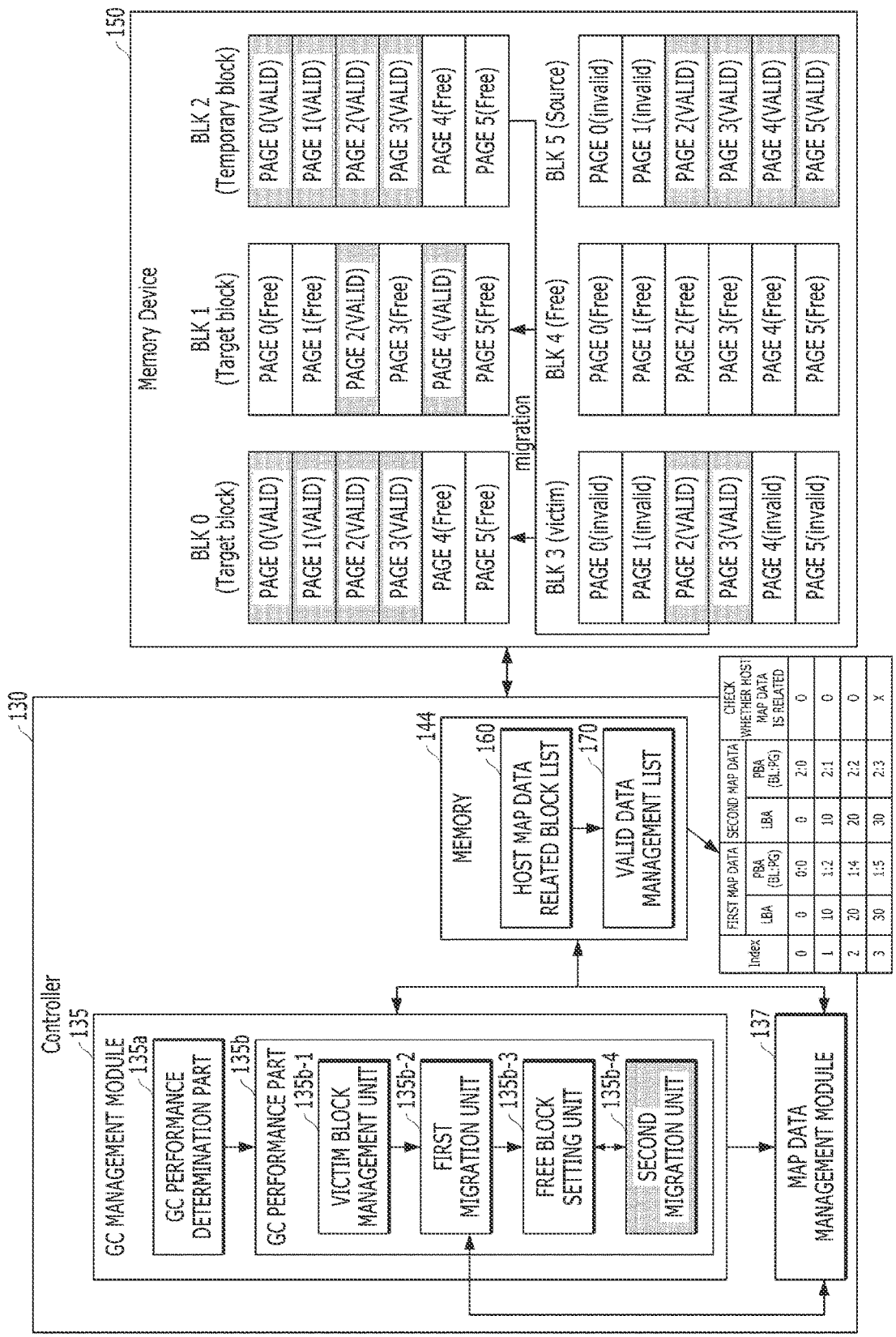

Referring to FIG. 7E, the second migration unit 135b-4 sets a block, which corresponds to an address of the temporary block in which the valid data related to the map data 166 in the host memory 106 among the plurality of valid data stored in the temporary block have been stored before the garbage collection operation is performed, as a target block, and performs a second migration operation on the valid data, That is, the second migration unit 135b-4 checks the first map data included in the map data 166 in the host memory 106 among the plurality of first map data stored in the valid data management list 170, and then checks the second map data corresponding to the checked first map data, to check the valid data related to the map data 166 in the host memory 106 among the plurality of valid data stored in the temporary block. The second migration unit 135b-4 may move valid data stored in the physical address included in the checked second map data to the physical address included in the first map data corresponding to the second map data. In this case, the controller can check the memory block through the physical address included in the first map data, and sets the checked memory block as a target block. For example, when the first map data of the zeroth, first and second indexes among the plurality of first map data included in the valid data management list 170 are included in the map data 166 in the host memory 106, the second migration unit 135b-4 may move valid data stored in the corresponding second map data back to the corresponding block and store the moved valid data in the corresponding block, with reference to the first map data in which the valid data has been stored before the garbage collection operation is performed, that is, which is an original location where the data has been stored before the valid data are moved to the temporary block.

In addition, the second migration unit 135b-4 may move, to free pages remaining in the target block, valid data, which are not related to the map data 166 in the host memory 106 among valid data stored in victim blocks not related to the map data 166 in the host memory 106 and the plurality of valid data stored in the temporary block and store the moved valid data in the remaining free pages. In this case, when the target block is configured as a plurality of target blocks, the target blocks may be determined according to a memory block number order. For example, the second migration unit 135b-4 may move, to in the zeroth target block, valid data from the third victim block, which is the victim block not related to the map data 166 in the host memory 106, and valid data from a third valid page in the temporary block and store the moved valid data in the zeroth target block.

Figure 7F:
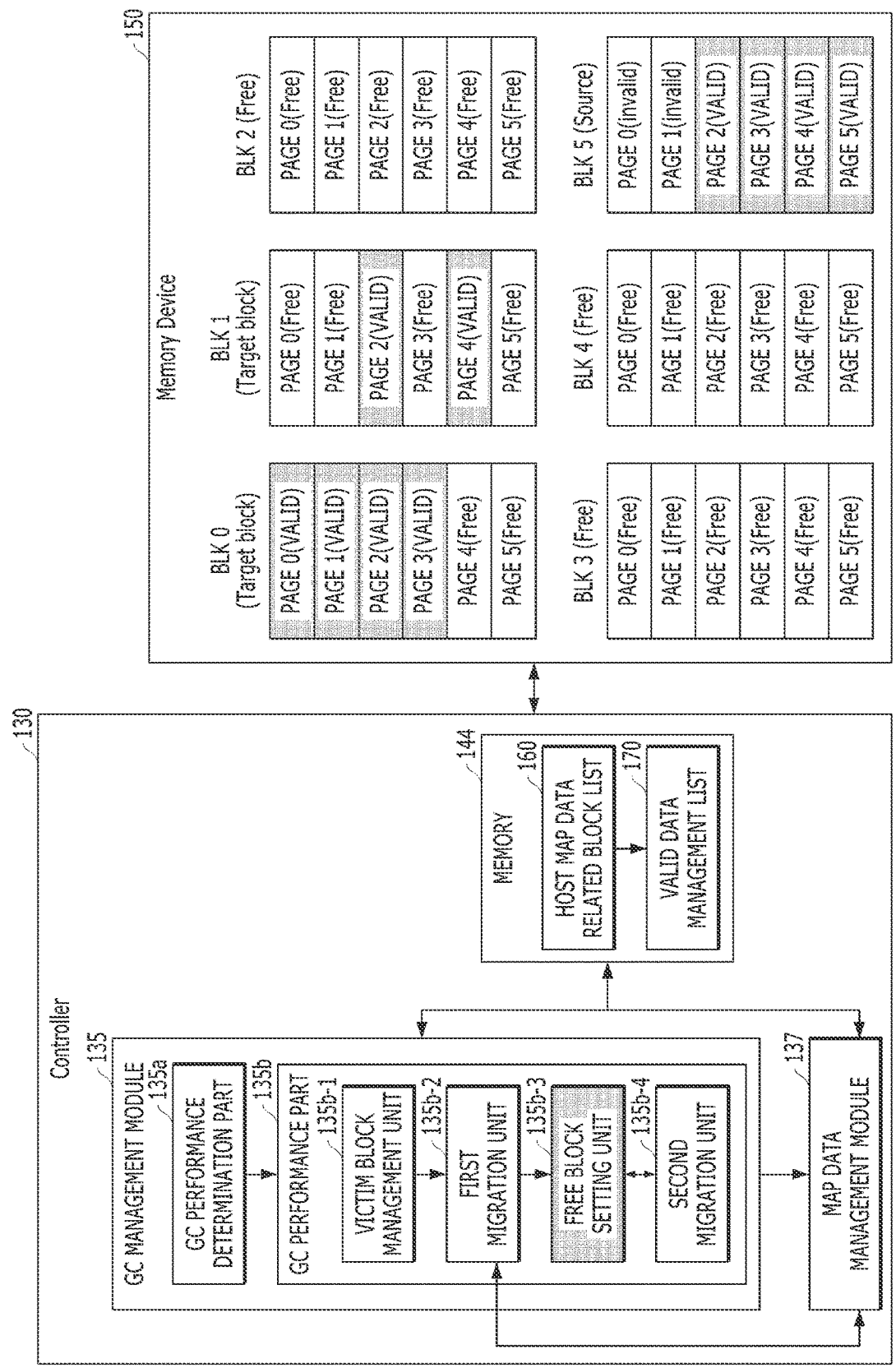

Referring to FIG. 7F, the free block setting unit 135b-3 may perform a second erase process on the temporary block and the victim blocks not related to the map data 166 in the host memory 106, and set the temporary block and the victim blocks as the free blocks. For example, the free block setting unit 135b-3 may erase all pages included in the second memory block, which is the temporary block, and the third victim block, and then set the second memory block and the third victim block as a second free block and a third free block.

In this case, since only map data of the valid data not related to the map data 166 in the host memory 106 are updated, the map data in the host memory may not be changed, and thus synchronization with the host may be minimized.

FIG. 8 is a diagram for describing an operating method of the memory system according to an embodiment of the present disclosure.

In operation S801, the controller 130 may select a plurality of victim blocks from a plurality of memory blocks to perform a garbage collection operation. That is, the controller 130 may perform the garbage collection operation by selecting, as a victim block, a source block having a valid page count equal to or less than a predetermined threshold value among a plurality of source blocks included in the plurality of memory blocks.

In operation S803, the controller 130 may move, to a temporary block, one or more pieces of valid data from one or more first victim blocks related to the map data 166 stored in the host memory 106 among the plurality of victim blocks. That is, the controller 130 may check the first victim blocks, which correspond to the map data 166 stored in the host memory 106 among the plurality of victim blocks, with reference to the host map data related block list including memory block information of one or more memory blocks related to the map data 166 stored in the host memory 106, As a check result, when the first victim blocks corresponding to memory block information of the host map data related block list are present among the plurality of victim blocks, the controller 130 may move one or more valid data from the first victim blocks to the temporary block and store the moved valid data in the temporary block.

On the other hand, when the first victim blocks corresponding to the memory bock information of the host map data related block list are not present among the plurality of victim blocks, the controller 130 selects any of a plurality of free blocks, sets the selected free block as a target block, copies one or more valid data stored in the plurality of victim blocks onto the target block and stores the copied valid data in the target block. Then, the controller 130 updates changed map data of the valid data.

In operation S805, the controller 130 may update first map data, which corresponds to each of the one or more valid data stored in the first victim blocks, and second map data indicating an address of the temporary block, in which the valid data corresponding to the first map data are moved, the first and second map data being in the valid data management list 170 included in the memory.

In operation S807, the controller 130 may perform an erase process on one or more first victim blocks, and set the erase-processed first victim blocks as target blocks.

In operation S809, the controller 130 may move, to the target block, the first valid data related to the map data 166 stored in the host memory 106 among the valid data stored in the temporary block, with reference to the first map data. That is, the controller 130 checks the first map data corresponding to the map data 166 stored in the host memory 106 among one or more first map data stored in the valid data management list 170. In addition, the controller 130 may move, to the target block, the first valid data, stored in the second map data corresponding to the checked first map data and move the first valid data to the original location indicated by the first map data corresponding to the first valid data, and store the moved first valid data in the address. In this case, since the map data 166 stored in the host memory 106 need not be updated, synchronization between the host 102 and the memory system 110 may be minimized.

In operation S811, the controller 130 may move, to the other pages of the target block, second valid data, which is the remaining valid data excluding the first valid data among the plurality of valid data stored in the temporary block, and valid data stored in the remaining victim blocks except for the first victim block among the plurality of victim blocks.

In operation S813, the controller 130 may update only map data corresponding to valid data not related to the map data stored in the host among the plurality of valid data stored in the target block.

The memory system according to the embodiments of the present disclosure may minimize updating of resources of an external device allocated to support a host performance booster (HPB) operation.

The effects obtainable from the present disclosure are not limited to those described herein. Other effects not described herein will be apparently understood by those skilled in the art, to which the present disclosure pertains, from the above detailed description.

While the present disclosure has been illustrated and described with respect to specific embodiments, t will be apparent to those skilled in the art that various changes and modifications may be made without departing from the spirit and scope of the disclosure as defined in the following claims. Therefore, the scope of the present disclosure encompasses ail variations that fall within the scope of the claims including their equivalents. Furthermore, the embodiments may be combined to form additional embodiments.

What is claimed is:

1. A memory system comprising:
 a memory device including a plurality of memory blocks; and
 a controller suitable for performing a garbage collection operation by:
 moving, when a first victim block related to map data stored in an external device is included in a plurality of victim blocks selected from the plurality of memory blocks, one or more pieces of valid data from the first victim block to a temporary block, which is a free block among the plurality of memory blocks,
 erasing the first victim block to set the first victim block as a first target block, and
 moving first valid data, which correspond to the map data stored in the external device among the valid data, from the temporary block to an original location within the first target block,
 wherein the first valid data is originally stored in the original location before the garbage collection operation.

2. The memory system of claim 1, wherein the controller moves the valid data from the first victim block to the temporary block by selecting the first victim block from among the plurality of victim blocks according to a host map data related block list.

3. The memory system of claim 2, wherein the host map data related block list includes information of one or more memory blocks related to the map data stored in the external device.

4. The memory system of claim 2, wherein the controller is further suitable for performing a garbage collection operation on remaining victim blocks other than the first victim blocks among the plurality of victim blocks, the garbage collection operation includes moving valid data from the remaining victim blocks to one or more free blocks among the plurality of memory blocks.

5. The memory system of claim 2, wherein the controller is further suitable for performing a garbage collection operation on remaining victim blocks other than the first victim blocks among the plurality of victim blocks, the garbage collection operation including:
 moving valid data from the remaining victim blocks to one or more free blocks among the plurality of memory blocks, and
 updating map data according to the moving of the valid data from the remaining victim blocks to the free blocks.

6. The memory system of claim 1,
 wherein the controller moves the valid data from the first victim block to the temporary block by storing first and second map data in a valid data management list,
 wherein the first map data indicates the valid data stored in the first victim block before the moving to the temporary block, and
 wherein the second map data indicates the valid data stored in the temporary block after the moving from the first victim block.

7. The memory system of claim 6, wherein the controller moves the first valid data from the temporary block to the original location within the first target block by moving the valid data indicated by the first map data included in the map data stored in the external device to the original location within the first target block.

8. The memory system of claim 7, wherein the controller is further suitable for moving, to remaining free space within the first target block, remaining valid data other than the first valid data from the temporary block and valid data from remaining victim blocks other than the first victim block.

9. The memory system of claim 8, wherein the controller is further suitable for updating map data according to the moving of the remaining valid data from the temporary block and the valid data from the remaining victim blocks.

10. The memory system of claim 1,
wherein the controller erases the first victim block to set the first victim block as the first target block to move thereto the first valid data from the temporary block and valid data from remaining victim blocks other than the first victim block.

11. The memory system of claim 1, wherein the controller is further suitable for erasing the temporary block and remaining victim blocks other than the first victim block among the plurality of victim blocks to set the erased blocks as free blocks.

12. The memory system of claim 1, wherein each of the plurality of victim blocks has valid pages, a number of which is a predetermined threshold value or less.

13. An operating method of a memory system, comprising:
selecting a plurality of victim blocks from a plurality of memory blocks;
moving one or more valid data from one or more first victim blocks to one or more temporary blocks, the first victim blocks being related to map data stored in a host among the plurality of victim blocks;
performing an erase process on the first victim blocks to set the erased first victim blocks as target blocks;
checking first valid data related to the map data stored in the host and checking previous map data corresponding to the first valid data and stored before the moving; and
moving the first valid data from the temporary blocks to first free pages within the target blocks, the first free pages being indicated by the previous map data.

14. The operating method of claim 13, wherein each of the plurality of victim blocks has valid pages, a number of which is a predetermined threshold value or less.

15. The operating method of claim 13,
wherein the moving of the valid data includes selecting the first victim blocks from among the plurality of victim blocks according to a host map data related block list, and
wherein the host map data related block list includes information of one or more memory blocks related to the map data stored in the host.

16. The operating method of claim 13, further comprising performing a garbage collection operation on remaining victim blocks other than the first victim blocks among the plurality of victim blocks, the garbage collection operation including:
moving valid data from the remaining victim blocks to one or more free blocks among the plurality of memory blocks; and
updating map data according to the moving of the valid data from the remaining victim blocks to the free blocks.

17. The operating method of claim 13,
wherein the moving of the valid data from the first victim blocks to the temporary blocks includes storing first and second map data in a valid data management list,
wherein the first map data indicates the valid data stored in the first victim blocks before the moving to the temporary blocks, and
wherein the second map data indicates the valid data stored in the temporary blocks after the moving from the first victim blocks.

18. The operating method of claim 17, wherein the first valid data related to the map data stored in the host is checked by:
checking the first map data corresponding to the map data stored in the host among one or more first map data stored in the valid data related list, and
checking the first valid data through the second map data corresponding to the checked first map data.

19. The operating method of claim 13, further comprising:
moving valid data from remaining victim blocks to remaining free pages other than the first free pages within the target blocks, the remaining victim blocks being ones other than the first victim blocks among the plurality of victim blocks; and
moving remaining valid data from the temporary blocks to the remaining free pages, the remaining valid data being data other than the first valid data among the valid data moved from the first victim blocks to the temporary blocks.

20. The operating method of claim 19, further comprising updating map data related to the valid data moved from the remaining victim blocks and the remaining valid data moved from the temporary blocks.

21. An operating method of a controller, the operating method comprising:
controlling a memory device to perform a garbage collection operation including moving, into one or more target blocks, first and second valid data respectively from first and second victim blocks, the garbage collection operation being performed without updating map data related to the first and second valid data;
controlling the memory device to move the first valid data from the target blocks back into an original location within the first victim block, which is erased because of the garbage collection operation; and
updating the map data related to the second valid data,
wherein the map data related to the first valid data is also stored in a host configured to provide the controller with a request for accessing the memory device together with a physical address selected from the map data stored therein.

* * * * *